United States Patent [19]

Ito et al.

[11] Patent Number: 5,821,984
[45] Date of Patent: Oct. 13, 1998

[54] COMMUNICATION CONFERENCE SYSTEM WITH STORAGE OF CONFERENCE INFORMATION INCLUDING PROCEEDINGS DATA

[75] Inventors: Kan Ito; Mizuki Muramatsu, both of Machida, Japan

[73] Assignee: Canon Kabushiki Kaisha, Tokyo, Japan

[21] Appl. No.: 117,699

[22] Filed: Sep. 8, 1993

[30] Foreign Application Priority Data

| Sep. 9, 1992 | [JP] | Japan | 4-266559 |
| Dec. 28, 1992 | [JP] | Japan | 4-361295 |
| Jan. 27, 1993 | [JP] | Japan | 5-011506 |
| Jan. 29, 1993 | [JP] | Japan | 5-034929 |

[51] Int. Cl.$^6$ ................................ H04N 7/15
[52] U.S. Cl. ........... 348/15; 379/93.21; 379/102.02; 379/102.04; 379/202; 370/260; 370/261
[58] Field of Search ................. 348/15, 14, 16, 348/17, 18, 19, 20; 379/94, 96, 202, 203, 204, 205, 100, 93.21, 93.17, 93.25, 102.04; 370/62, 260, 261; H04N 7/15

[56] References Cited

U.S. PATENT DOCUMENTS

| 4,723,269 | 2/1988 | Summerlin | 379/102.04 |
| 4,953,159 | 8/1990 | Hayden et al. | 379/93.21 |
| 5,012,509 | 4/1991 | Nakamura et al. | 348/15 |
| 5,057,941 | 10/1991 | Moriya | 379/100 |
| 5,065,392 | 11/1991 | Sibbitt et al. | 379/112 |
| 5,136,581 | 8/1992 | Muehrcke | 348/15 |
| 5,206,721 | 4/1993 | Ashida et al. | 348/15 |
| 5,257,306 | 10/1993 | Watanabe | 348/15 |
| 5,323,445 | 6/1994 | Nakatsuka | 348/15 |
| 5,333,152 | 7/1994 | Wilber | 379/102 |
| 5,382,972 | 1/1995 | Kannes | 348/15 |
| 5,440,624 | 8/1995 | Schoff, II | 379/202 |
| 5,530,472 | 6/1996 | Bregman et al. | 379/93.21 |

FOREIGN PATENT DOCUMENTS 404082357  3/1992  Japan ........................ 370/62

*Primary Examiner*—Stella Woo
*Attorney, Agent, or Firm*—Fitzpatrick, Cella, Harper & Scinto

[57] ABSTRACT

When a closing time for data transmission is reserved by a transmission source terminal, a multi-point control unit secures idle time periods of a destination terminal before the closing time, and enters this information in a central storage unit. If a plurality of destination terminals are set, the multi-point control unit enters destination terminal information and transmission closing time information for each individual destination terminal. When a transmission reserved time is reached, the multi-point control unit transmits the data entered in the central storage unit through communication lines.

13 Claims, 25 Drawing Sheets

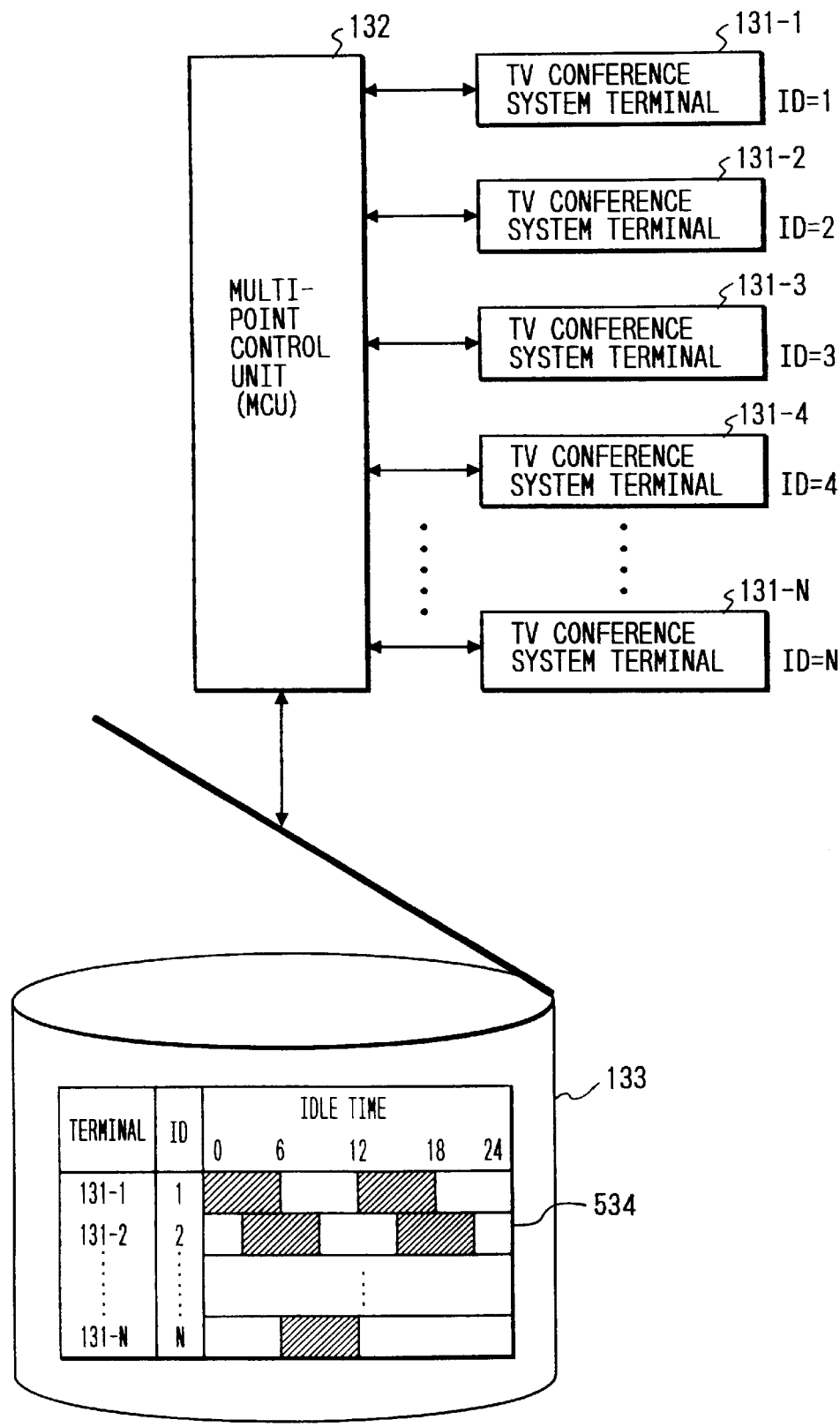

FIG. 15
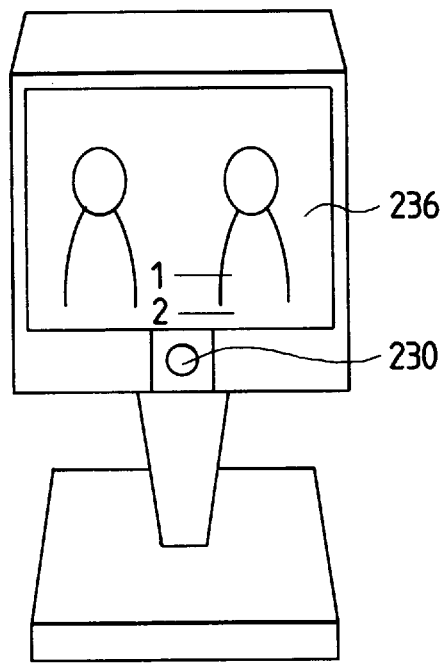
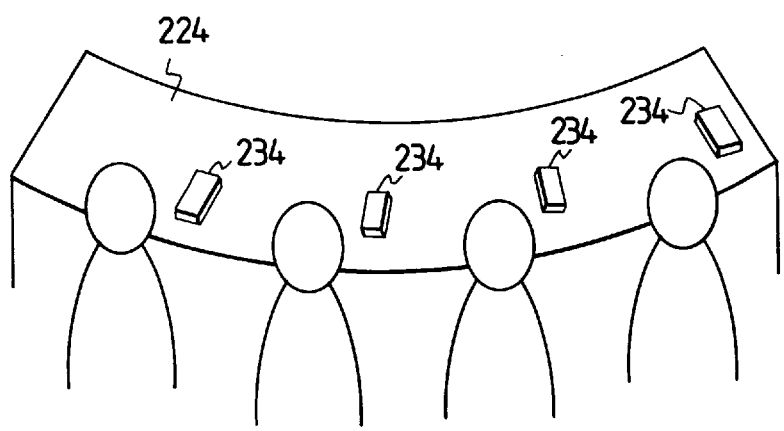

COMMUNICATION CONFERENCE SYSTEM WITH STORAGE OF CONFERENCE INFORMATION INCLUDING PROCEEDINGS DATA

BACKGROUND OF THE INVENTION

1. Field of the Invention

The present invention relates to a communication system and its terminals for transmitting image data and voice data to perform communications between distant places.

1. Related Arts

A television conference system generally handles image information of motion pictures and still pictures, voice information, and character code information such as computer data. In the system, one or a plurality of participants in a conference uses one station or one terminal apparatus, and a plurality of stations are connected through exclusive or general communication lines, thereby communicating the above information to one another.

FIG. 1 is a block diagram showing a practical arrangement of a terminal used in a conventional TV conference system.

Referring to FIG. 1, video input/output devices 11 include a video camera for imaging, e.g., attendants at a conference of a self-station, a main monitor for displaying motion pictures from partner's stations, and the like. Audio input/output devices 12 include, e.g., a microphone and a loudspeaker.

Input/output devices 13 process data other than those processed by the input/output devices 11 and 12. More specifically, the input/output devices 13 include a keyboard of a computer or an input device for still pictures, a digitizer for inputting plotting pictures or other auxiliary input devices, and a submonitor for displaying images from the video camera, a screen of the computer, images of still pictures/plotting pictures, or images from other auxiliary devices.

A codec unit 100 constitutes a main part of the TV conference system.

FIG. 2 is a block diagram showing the arrangement of the codec unit 100.

A video I/O unit 101 is an interface to the camera or the monitor and includes a screen processing unit capable of performing screen division, screen synthesis, and character synthesis. An audio I/O unit 102 is an interface to the microphone and the loudspeaker and includes a voice processing unit serving as, e.g., an echo canceler.

A computer unit 103 controls basic TV conference functions and other computer conference functions. A still picture/plotting picture control unit 104 controls, e.g., a still picture transfer function and a picture plotting function, and an auxiliary device control unit 105 controls other image processing devices. The computer unit 103, the still picture/plotting picture control unit 104, and the auxiliary device control unit 105 perform communications via a data port 106.

A communication control unit 107 realizes a function such as end-end control for establishing signals and a common mode for operations, such as network access performed by an interconnection procedure control unit 108 and a proper terminal operation performed by a network signal control unit 109.

A video codec 110 performs redundancy compression coding and decoding for video signals, and an audio codec 111 performs similar processing operations for audio signals. A delay circuit 112 for an audio bus corrects the delay of the video codec 110 in order to obtain lip-sync.

A multiplex transfer unit 113 multiplexes a video signal, an audio signal, and a control signal into one bit string and transmits the bit string or demultiplexes a received bit string into constituent multimedia signals. A network interface unit 114 realizes a necessary adaptation between a network 115 and terminals.

An inter-multipoint control unit 116 performs control for interconnecting multiple points in the TV conference system.

FIG. 3 is a block diagram showing the arrangement of the inter-multipoint control unit 116.

A multiplexing/demultiplexing (MUX/DMUX) unit 21 multiplexes a video signal and an audio signal into a data signal to be transmitted or demultiplexes a received data signal into a video signal and an audio signal. An image selection control unit 22 selects data to be distributed from motion picture data transmitted from individual stations. A voice mixer 23 synthesizes voices from the individual stations. A data selection control unit 24 selects and distributes data, such as still picture data and computer data, other than the motion picture data. A controller 25 controls the image selection control unit 22, the voice mixer 23, and the data selection control unit 24.

FIG. 4 is a block diagram showing the whole system when multiple stations are interconnected.

In a communication system such as the TV conference system as described above, however, adjustment of a schedule of communications needs to be performed by using telephones. In addition, each terminal requires a memory for storing schedule data of that terminal, increasing the device size of the terminal.

Furthermore, since the TV conference system itself does not form the proceedings of a conference, it is difficult for the secretary of the conference to form the conference proceedings including the materials for that conference. The formation of the proceedings therefore requires much labor and a long time.

In the above conventional TV conference system, participants in a conference at a remote place must request a special distribution of, e.g., the proceedings of the conference by mail or by using an electronic mail system in order to refer to the proceedings and the like. In the electronic mail system, an operation of transmitting the proceedings to terminals requiring them or an operation of writing them into a common file needs to be performed at a station having the proceedings. The former operation is very cumbersome because the proceedings must be transmitted to each terminal requiring them. In the latter operation, on the other hand, a file server for storing the common file must be normally set in an operative state, i.e., a power-ON state.

In the conventional TV conference system, when a single terminal apparatus is used to selectively photograph one of a plurality of persons, panning, tilting, and zooming of the camera are controlled by manual operations. This disables the speedy operation of the system and hence makes a smooth progress of a conference difficult.

In the conventional TV conference system, proceedings data including video data and audio data in conference are sequentially transmitted to partner's stations. Therefore, when multiple points are connected in the system, all the proceedings data are transmitted to a given partner's station regardless of whether the station requires the data. In addition, proceedings data not to be transmitted to a particular station is also transmitted to that station.

Furthermore, in a communication system such as a TV conference system, when data concerning a conference, such as motion pictures, still pictures, and voices, stored in a self-station is to be transmitted to a partner's station which did not attend the conference, confusion may result if the data is transmitted to that destination station while the TV conference system of the destination station is being connected with another station.

Moreover, to transmit data to a plurality of partner's station terminals, an idle time of a self-station and idle times of the individual partner's stations are entered in a storage unit of the self-station, and so transmission times of data related to the same conference are stored in a time schedule of the self-terminal. In the worst case, the storage unit becomes full of only time schedule data for the data to be transmitted, making it impossible to store time schedule data of most importance for holding a TV conference.

SUMMARY OF THE INVENTION

It is an object of the present invention to provide a communication system and a TV conference system which can individually or entirely solve the above conventional problems.

It is another object of the present invention to provide a communication system and a TV conference system which can easily enter communication schedules.

It is still another object of the present invention to provide an easy-to-handle TV conference system and an easy-to-handle method of forming proceedings data.

It is still another object of the present invention to provide a TV conference system which can perform communications regardless of a difference in transmission time, such as a difference in time between places, and is economical.

It is still another object of the present invention to provide a conference terminal and a TV conference system which can easily identify communication data.

To achieve the above objects, one preferred embodiment of the present invention discloses a conference terminal for performing communications between a plurality of terminals, comprising identifying means for identifying a point at which the type of conference information concerning a conference held by communications between a plurality of terminals changes, first storage means for storing the conference information, and second storage means for storing, as index data, the point at which the type of conference information changes and which is determined by the identifying means.

It is still another object of the present invention to provide a communication system and a TV conference system which have novel functions.

Other objects and features of the invention will become apparent from the following detailed description of the embodiments taken in conjunction with the accompanying drawings.

BRIEF DESCRIPTION OF THE DRAWINGS

FIG. 5 is a view showing the arrangement of a TV conference system according to the first embodiment of the present invention;

FIG. 15 is a view for explaining the terminal apparatus and the arrangement of figures according to the fifth embodiment;

DETAILED DESCRIPTION OF THE PREFERRED EMBODIMENTS

<1st Embodiment>

Figure 1:
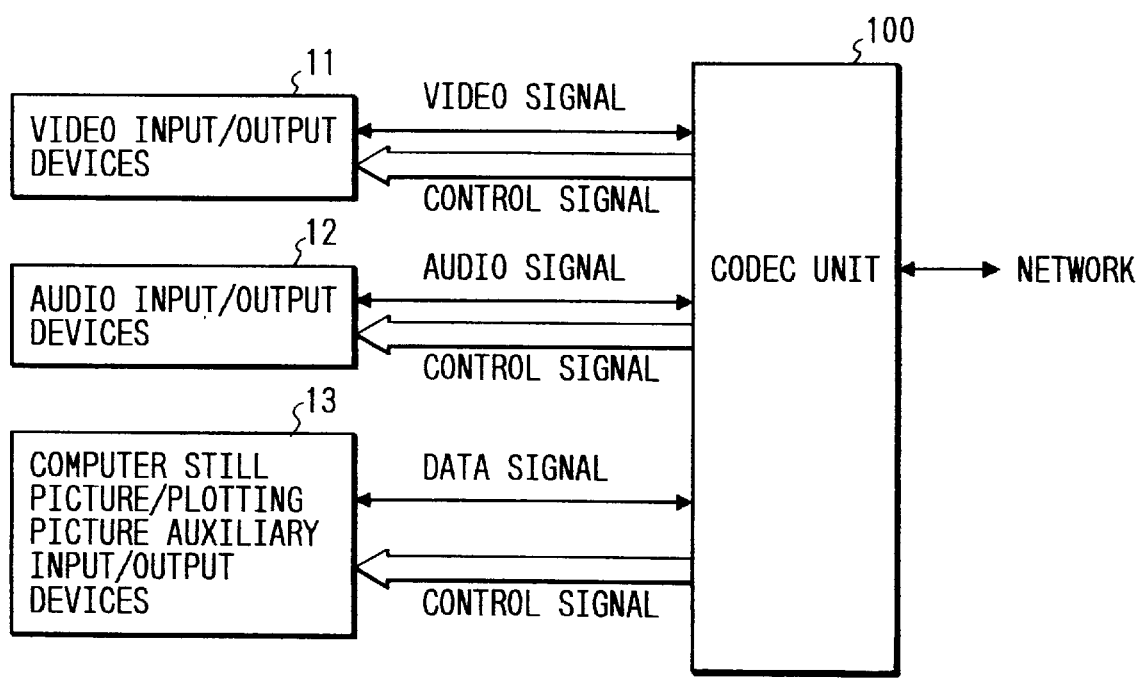
FIG. 1 is a block diagram showing a terminal apparatus used in a conventional TV conference system.

FIG. 5 shows the arrangement of a TV conference system according to the first embodiment of the present invention. The system of this embodiment comprises a plurality of (=N) terminals 131-1 to 131-N for transmitting TV conference data, such as image and voice data and computer data, in order to hold a conference through a network, a multi-point control unit (MCU) 132 which is connected to the terminals 131-1 to 131-N through the network and performs management and control for the individual terminals, and a central storage unit 133 for storing time schedule data of the terminals 131-1 to 131-N transmitted from these terminals. As indicated by reference numeral 534 in FIG. 5, idle times of the individual terminals are stored in correspondence with the terminals in the central storage unit 133.

Figure 6:
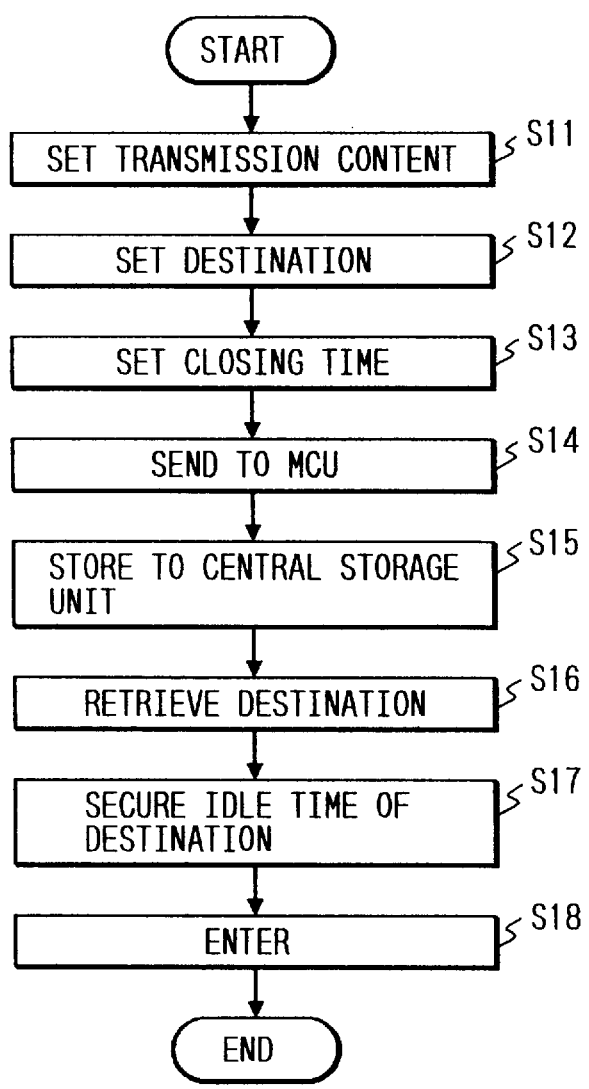
FIG. 6 is a flow chart showing a process of entering a communication time according to the first embodiment.

An operation of entering a time schedule of each terminal into the central storage unit 133 will be described below with reference to FIGS. 6 and 7.

Figure 7:
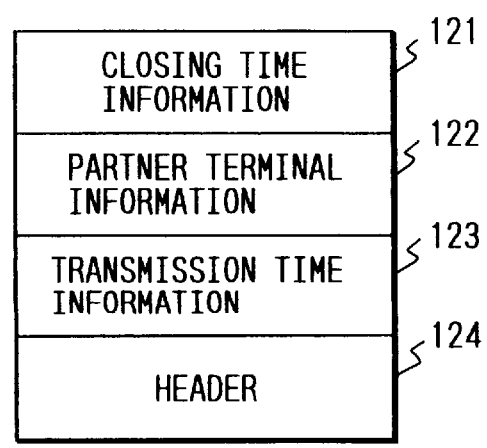
FIG. 7 is a view showing the format of transmission data to be transmitted from each terminal according to the first embodiment.

First, an operator writes a subject and a brief of a TV conference as transmission contents into a header area 124 shown in FIG. 7 at a self-terminal (step S11).

Subsequently, the operator sets a destination terminal (step S12) and a closing time (step S13). The operator then writes these pieces of information into a partner's terminal information area 122 and a closing time information area 121 shown in FIG. 7, and transmits the data shown in FIG. 7 to the multi-point control unit (MCU) 132 (step S14).

The multi-point control unit 132 of this embodiment has the central storage unit 133 for managing time schedules and a function of performing access re-schedule adjustment. The multi-point control unit 132 stores the received data into the central storage unit 133 (step S15). The multi-point control unit then retrieves idle times of the destination terminal from the storage unit (step S16), and secures an idle time of the destination before the closing time (step S17). The multi-point control unit 132 enters the secured time as transmission time information into a transmission time information area 123 of the central storage unit 133, which is stored in step S15 (step S18). If a plurality of destination terminals are set in step S12, destination terminal information and closing time information of each individual terminal are entered.

If the partner's terminal has no idle time for the TV conference before the closing time transmitted to the multi-point control unit 132, the closing time must be reset at the self-terminal.

When the communication time entered in step S18 is reached, the multi-point control unit 132 connects the lines of the self-terminal and the partner's terminal.

According to the first embodiment as described above, idle times of all the terminals constituting the system are stored in the central storage unit 133, and the multi-point control unit 132 can retrieve them. An operator who intends to set a TV conference at a given terminal therefore need not check idle times of partner's terminals to adjust schedules by using a telephone.

Since each terminal need not store schedule data of the self-terminal, the memory quantity at the terminal can be saved. In addition, the device size of each terminal can be decreased because no control unit for adjusting time schedules is required at the terminal.

<2nd Embodiment>

Figure 8:
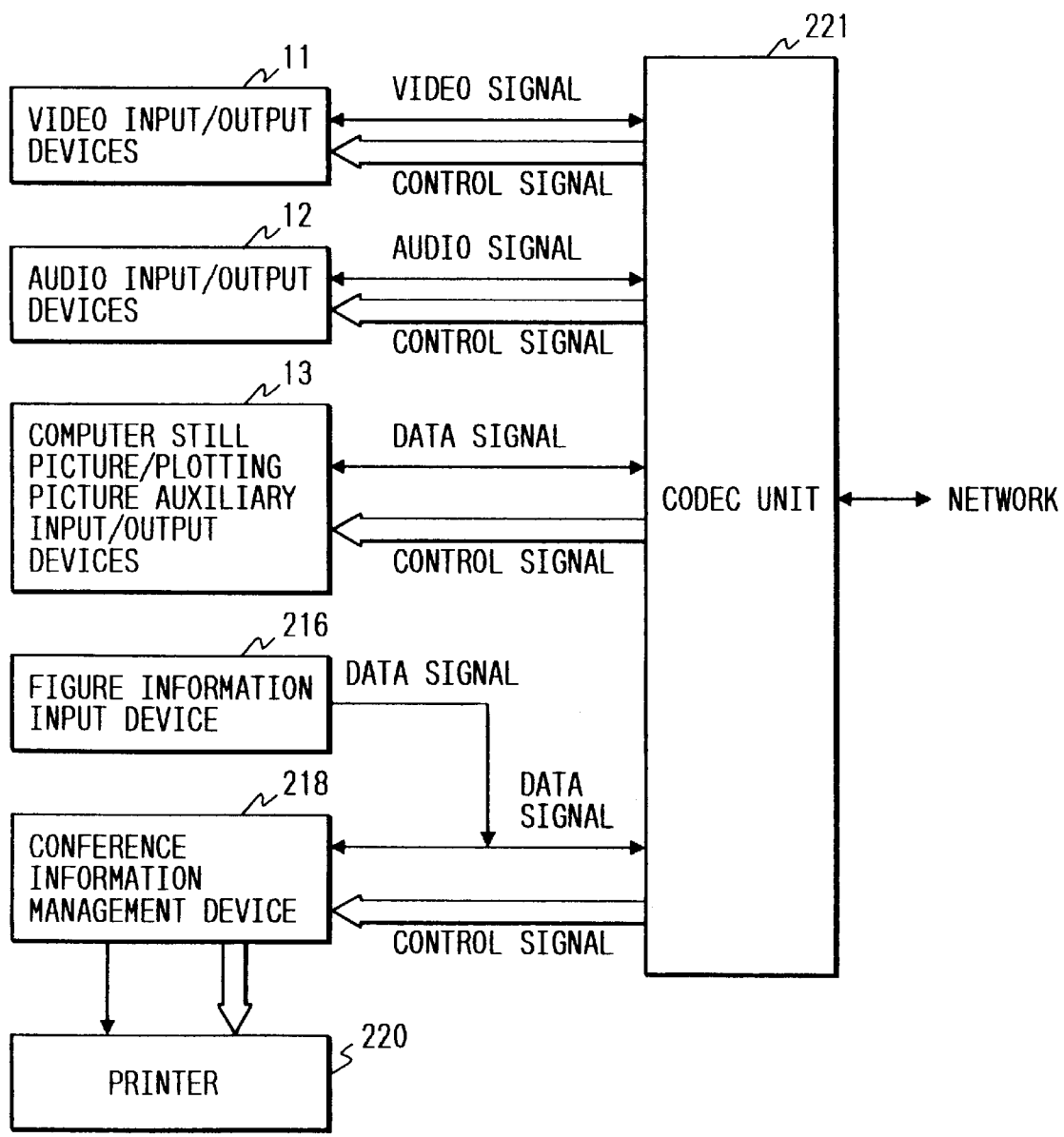
FIG. 8 is a block diagram showing a terminal apparatus according to the second embodiment of the present invention.

FIG. 8 is a block diagram showing the arrangement of a terminal apparatus according to the second embodiment of the present invention, which automatically forms basic materials for conference proceedings.

In FIG. 8, the same reference numerals as in FIG. 1 denote parts having the same functions and a detailed description thereof will be omitted. A figure information input device 216 is used to input information (e.g., names and posts) for specifying participants (including a secretary and the like) who take part in a TV conference at this terminal. The figure information input device 216 is more specifically a magnetic card, an optical card, a magnetooptical card, or a memory card, each of which can store information, or a keyboard with a simple structure. The figure information input device 216 can also be a device for designating a record of interest from a figure information file in the form of a database.

A conference information management device 218 stores the names of attendants at a TV conference, data used in the conference, the attributes (e.g., motion picture data, still picture data, and character data) of the data, and proceedings formed from these information into a large-capacity storage unit. The conference information management device 218 has a function of editing the stored information and can print out the edited results from a printer 220.

Figure 9:
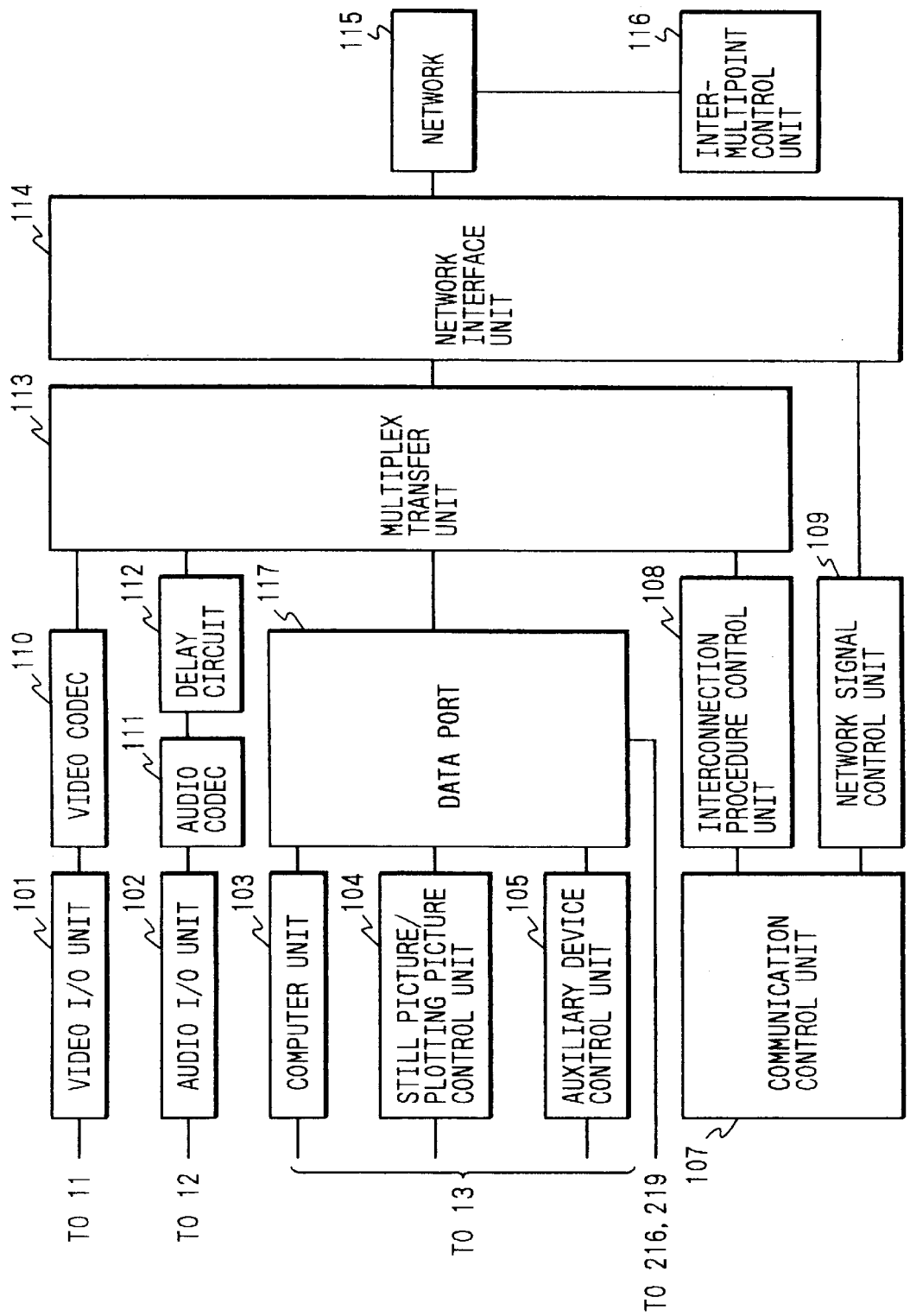
FIG. 9 is a block diagram showing a codec unit according to the second embodiment.

A codec unit 221 is the main body of the terminal apparatus, and the details of the codec unit 221 are shown in FIG. 9. In FIG. 9, the same reference numerals as in FIG. 2 denote parts having the same functions and a detailed description thereof will be omitted.

A data port 117 receives inputs from a computer unit, a still picture/plotting picture control unit, and an auxiliary device control unit mentioned earlier with reference to FIG. 2, and also performs transfer of data from the figure information input device 216 and the conference information management device 218.

An operation of holding a TV conference according to this embodiment will be described in detail below.

Prior to starting the TV conference, the names and the titles of participants in the conference are input from the figure information input device 216 at each station or terminal. As an example, an ID card reader is provided beforehand in the figure information input device 216, and each participant in the conference is given an ID card recording his or her name or ID number. At the beginning of the conference, each participant manipulates the ID card reader to read his or her own ID card.

In accordance with the input figure information or ID information from the figure information input device 216, figure information cited from another database is stored in the storage unit of the conference information management device 218.

The conference information management device 218 has an internal clock and stores all motion picture information, still picture information, and character information as conference materials, together with storage times, into its internal storage unit. To collect the conference materials information to the conference information management device 218, the conference information management device 218 at a particular terminal monitors information transmitted between stations taking part in the TV conference and stores the information in the internal storage unit. Alternatively, individual terminals participating in the TV conference write all information as conference materials into the internal storage unit of the conference information management device 218 at a specific terminal, and this specific terminal simultaneously transmits the received conference materials to the other terminals.

The conference information management device 218 stores input motion pictures by compressing them in accordance with a predetermined compression coding scheme, and stores input still pictures either directly or by compressing them. A frame memory is provided for this purpose.

In the same manner as described above, the conference information management device 218 also stores the states of progress of proceedings, such that at mm:nn, conference begins at mm:nn, communication of motion pictures is started at mm:nn, motion pictures are transferred from station A to station B at mm:nn, computer data is transferred from station A to station B at mm:nn, conference ends.

When the conference ends, the information stored in the conference information management device 218 are output to the monitors of the individual stations. Participants at each station write comments or images while monitoring the conference information displayed on the monitor. The written information is transferred to and stored in the conference information management device 218. A person in charge of formation of proceedings makes proceedings by appropriately combining the names of the attendants at the conference, the documents used as the conference materials, and the comments written after the end of the conference. The proceedings thus formed can be printed out from the printer 220.

In this manner, proceedings can be made very speedy in this embodiment. Since the proceedings are stored in the storage unit connected to the terminals used in the TV conference, they can be transmitted to the individual stations taking part in the TV conference immediately after they are made.

<3rd Embodiment>

Figure 10:
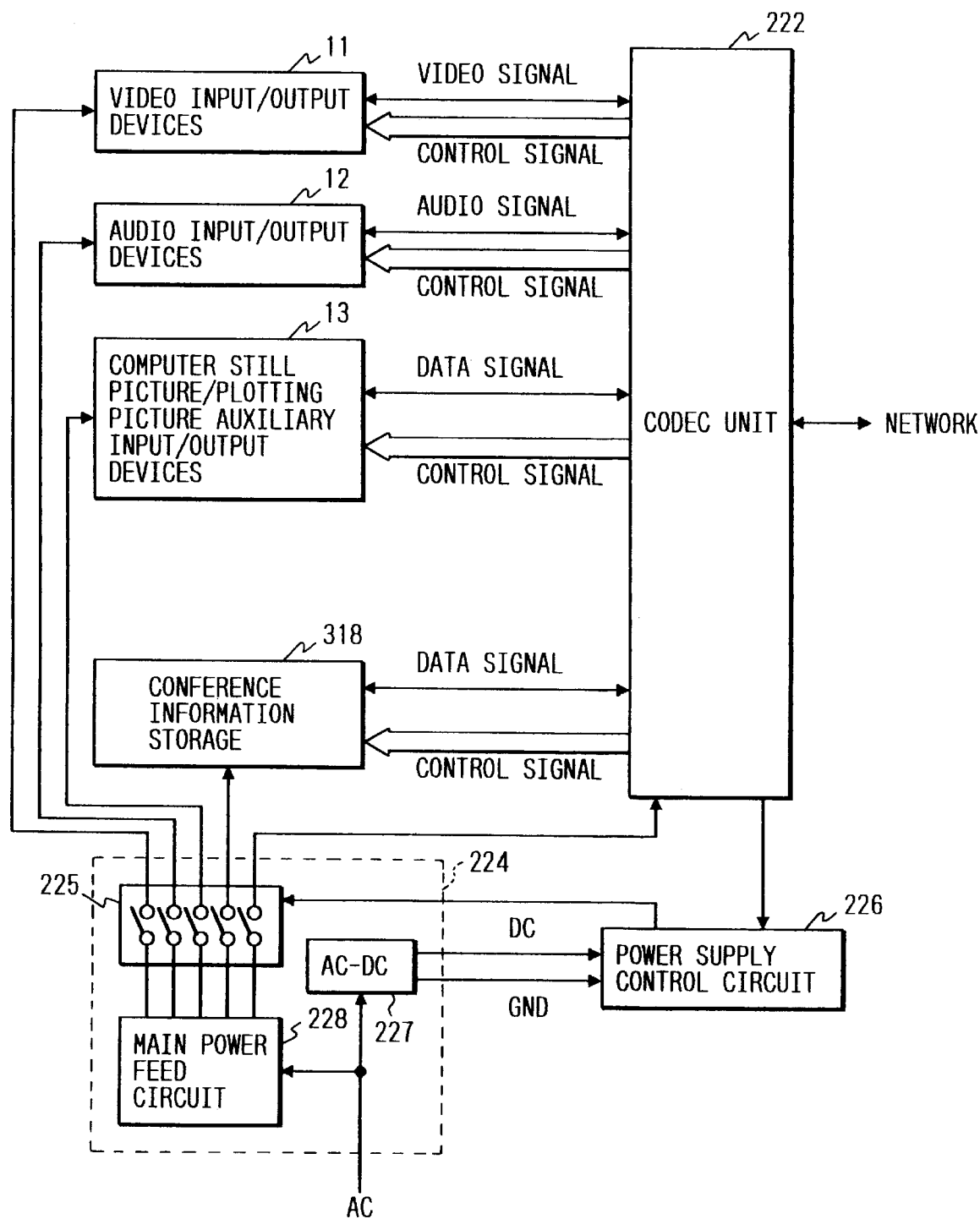
FIG. 10 is a block diagram showing a terminal apparatus according to the third embodiment of the present invention.

Prior to transmitting proceedings, the reception side must be set in a state capable of receiving the proceedings. In this respect, it is convenient to be able to read out proceedings at any given time from the reception side which requires the proceedings, instead of transmitting the proceedings from the transmission side which formed the proceedings. An embodiment for this purpose is shown in FIG. 10. In the embodiment shown in FIG. 10, power supply to individual parts at terminals of partner's stations can be independently controlled through transmission lines by a self-station.

The arrangement shown in FIG. 10 will be described in detail below. In FIG. 10, the same reference numerals as in FIGS. 1 and 8 denote parts having the same functions and a detailed description thereof will be omitted. A conference information storage 318 for storing proceedings formed may be either an internal storage unit of a conference information management device 218 shown in FIG. 8 or another exclusive or general-purpose storage unit. The conference information storage 318 may store all materials information of a TV conference.

A power supply unit 224 supplies power to the individual parts shown in FIG. 10. A power supply control circuit 226 controls the power supply from the power supply unit 224 to the individual parts. The power supply unit 224 comprises a main power feed circuit 228 for generating power supply voltages for the individual parts from an AC input, an AC-DC converter 227 for generating a DC power supply voltage for the power supply control circuit 226 from the AC input, and a switching device 225 having a plurality of switches for switching on/off the power supply from the main power feed circuit 228 to the individual parts, i.e., input/output devices 11 to 13, a codec unit 222, and the conference information storage 318. The power supply control circuit 226 opens/closes the switches of the switching device 225 in accordance with control signals from the codec unit 222.

Although the codec unit 222 as the main body of the terminal is basically the same as the codec unit 221 shown in FIG. 8, it has an additional function of transferring to the power supply control circuit 226 input power supply control signals from the I/O devices 11 to 13 and power supply control signals externally applied through communication lines.

At the terminal shown in FIG. 10, the power supply control circuit 226 is normally set in a power supply state. A person who has made proceedings stores the proceedings formed in the conference information storage 318 and enters terminals or figures that are allowed to read out the proceedings. In this case, a terminal can be entered by using its telephone number or password, and a figure can be entered by using his or her password. Thereafter, the power supply to the I/O devices and the storage 318 except for the codec unit 222 is cut off. That is, only the codec unit 22 and the power supply control circuit 226 are powered and set in an operative state.

Upon receiving an external power supply control signal for a particular one of the devices 11 to 13 and the storage 318 from a communication network, the codec unit 222 transfers the power supply control signal to the power supply control circuit 226. The power supply control circuit 226 turns on or off the corresponding switch of the switching device 225 of the power supply unit 224.

Figure 11:
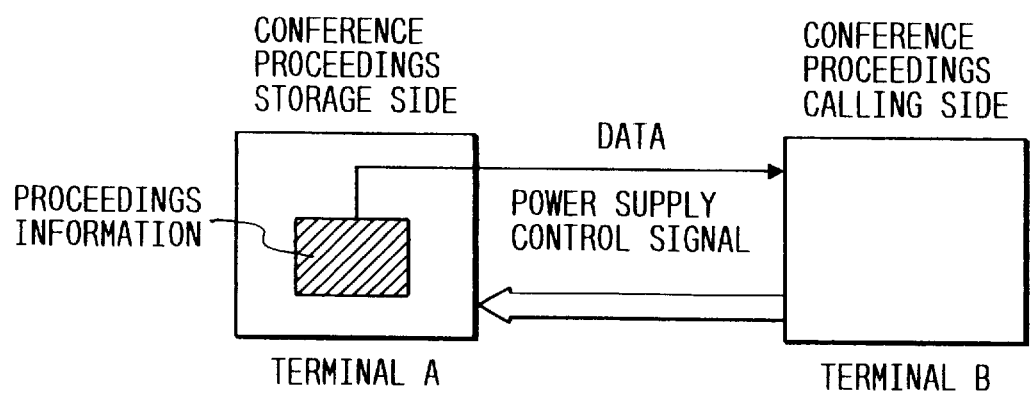
FIG. 11 is a view showing power supply control and the flow of data according to the third embodiment.

An operation performed when a terminal at a remote place is to read out proceedings will be described below. Assume in FIG. 11 that a terminal A has the arrangement shown in FIG. 10, in which proceedings information is stored in the conference information storage 318, and a terminal B is to read out the proceedings information. The terminal B transmits to the terminal A a power supply control signal for supplying power to the conference information storage 318 through a communication line. In response to this power supply control signal, the terminal A supplies power to the conference information storage 318 to set the storage 318 in an operative state. The codec unit 222 checks in accordance with the telephone number or the password of a terminal or a figure requesting read of the proceedings information whether the terminal or the figure is permitted to read that information. If the terminal or the figure is a permitted one, the codec unit 222 permits the terminal B to access the conference information storage 318. Consequently, the terminal B can read out the information stored in the conference information storage 318 of the terminal A.

In some cases, a person who could not take part in a conference intends to reflect a desired content on the conference. By taking such a situation in account, it is also possible to allow a particular person to perform additional writing into the conference information storage 318.

When the terminal B finishes the access to the conference information storage 318 of the terminal A, the terminal B transmits to the terminal A a control signal for switching off the power supply to the conference information storage 318. At the terminal A, the power supply control circuit 226 cuts off the power supply to the conference information storage 318 in response to the power supply control signal from the terminal B, and informs the terminal B of the result. The terminal B confirms the power off of the conference information storage 318 and ends the communication.

With the arrangement shown in FIG. 10, a terminal at a distant place can read out conference information, such as proceedings and conference materials, at any given time. This is useful when, for example, a person who could not participate in a TV conference because of a difference in time or the like wants to know the detailed contents and/or the summary of the conference.

<4th Embodiment>

When a terminal at a remote place is going to read out conference information (e.g., conference materials and proceedings) stored in a conference information storage 318, it is very inconvenient if the information can be read out only in a predetermined order. This work can be executed efficiently if some retrieving means is provided. In this case, it is convenient to be able to confirm the data quantity (e.g., the length of motion pictures, the number of frames of still pictures, and the quantity of computer data) of individual information or the donor of data prior to reading out the information.

Figure 12:
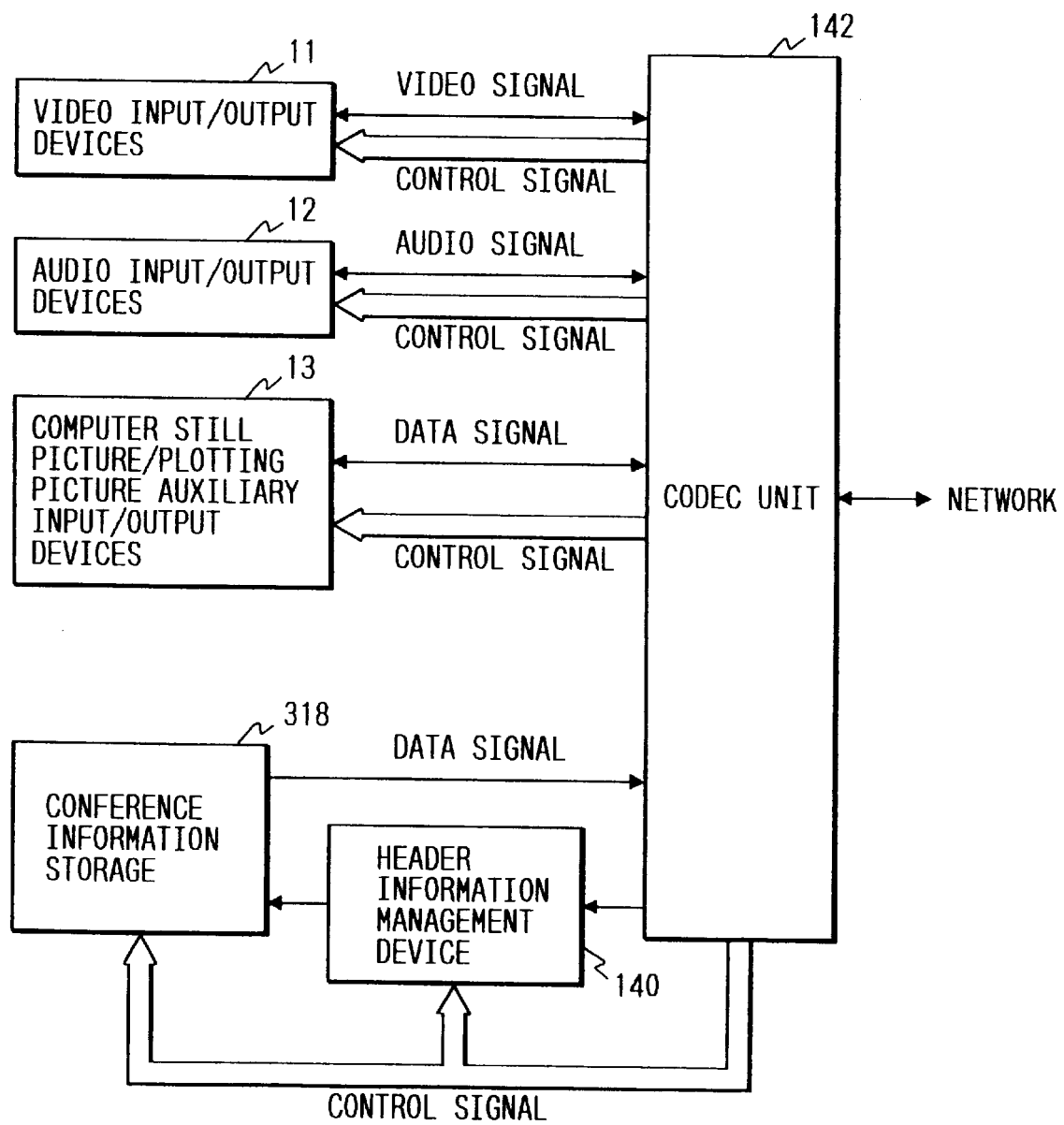
FIG. 12 is a block diagram showing a terminal apparatus according to the fourth embodiment of the present invention.

FIG. 12 is a block diagram showing the arrangement of the fourth embodiment of the present invention, in which the quantity of data and the donor of the data are stored as header information together with the data. In FIG. 12, the same reference numerals as in FIG. 10 denote the same parts. Note that the power supply unit 224 and the power supply control circuit 226 are omitted from FIG. 12. Referring to FIG. 12, a header information management device 140 discriminates the data type (e.g., motion picture data, still picture data, and computer data) of conference materials stored in sequence in the conference information storage 318, and stores the data type discriminated and the duration (or the quantity) of the data, as header information, in an internal storage unit (or the conference information storage 318). A codec unit 142 is the main body of the terminal.

Figure 13:
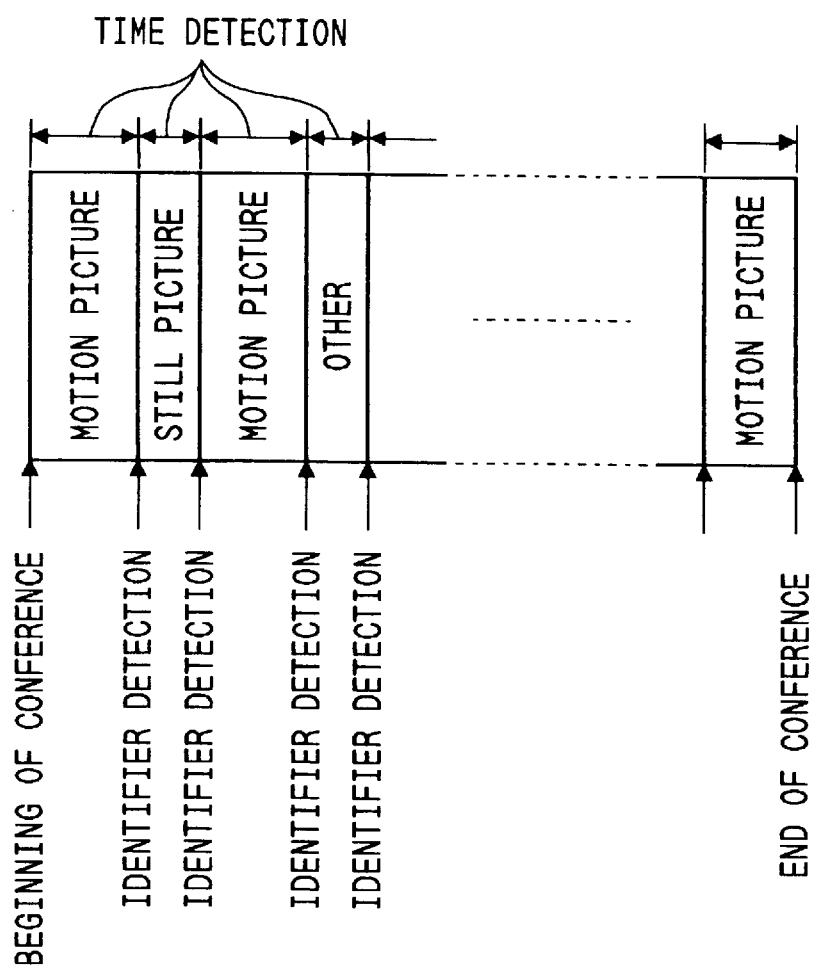
FIG. 13 is a view showing an example of proceedings information according to the fourth embodiment.

The codec unit 142 inserts specific identifiers at the ends of individual materials data (e.g., motion picture data, still picture data, and computer data) in TV conference and supplies the data to the header information management device 140. As shown in FIG. 13, the header information management device 140 discriminates the ends of data of individual types in accordance with the identifiers inserted between them and also counts the duration or the quantity of each data. The header information management device 140 then stores the type of data and the duration (or the quantity) of the data, as items of an index, into an internal storage unit.

The header information management device 140 supplies data obtained by removing the identifiers from the input data from the codec unit 142 to the conference information storage 318. The conference information storage 318 sequentially stores this input data.

In this manner, the types and the quantities of data provided at the conference are stored as an index in time-sequential manner into the internal storage unit of the header information management device 140 when the conference ends. At the end of the conference, it is preferred to give an appropriate title to each data and store the title as the header information.

A table showing the correspondence between the items of the header information (index) and the storage positions of the corresponding data in the conference information storage 318 is preferably stored in one of the conference information storage 318 and the header information management device 140.

A person who did not take part in the conference or intends to repeatedly confirm the contents of the conference and who is permitted to read out the information can access the terminal having the conference information storage 318 through a communication line, thereby reading out the necessary information. This operation is basically the same as that performed by the arrangement shown in FIG. 10. In response to a read request for the conference information stored in the conference information storage 318, the codec unit 142 at the terminal apparatus outputs management information stored in the header information management device 140. This allows a person who intends to read out the conference information stored in the conference information storage 318 to check, e.g., the data type and the data quantity of the conference information by means of the header information. That is, the person can obtain basic information for determining the range of data to be actually read out.

It becomes possible to rapidly read out the information of interest by using the table showing the correspondence between the items of the header information (index) and the storage positions of the corresponding data in the conference information storage 318.

<5th Embodiment>

The fifth embodiment of the present invention capable of selecting a given one figure or a plurality of figures from a plurality of participants in a conference as objects to be photographed and photographing the one figure or the plurality of figures selected will be described below.

Figure 14:
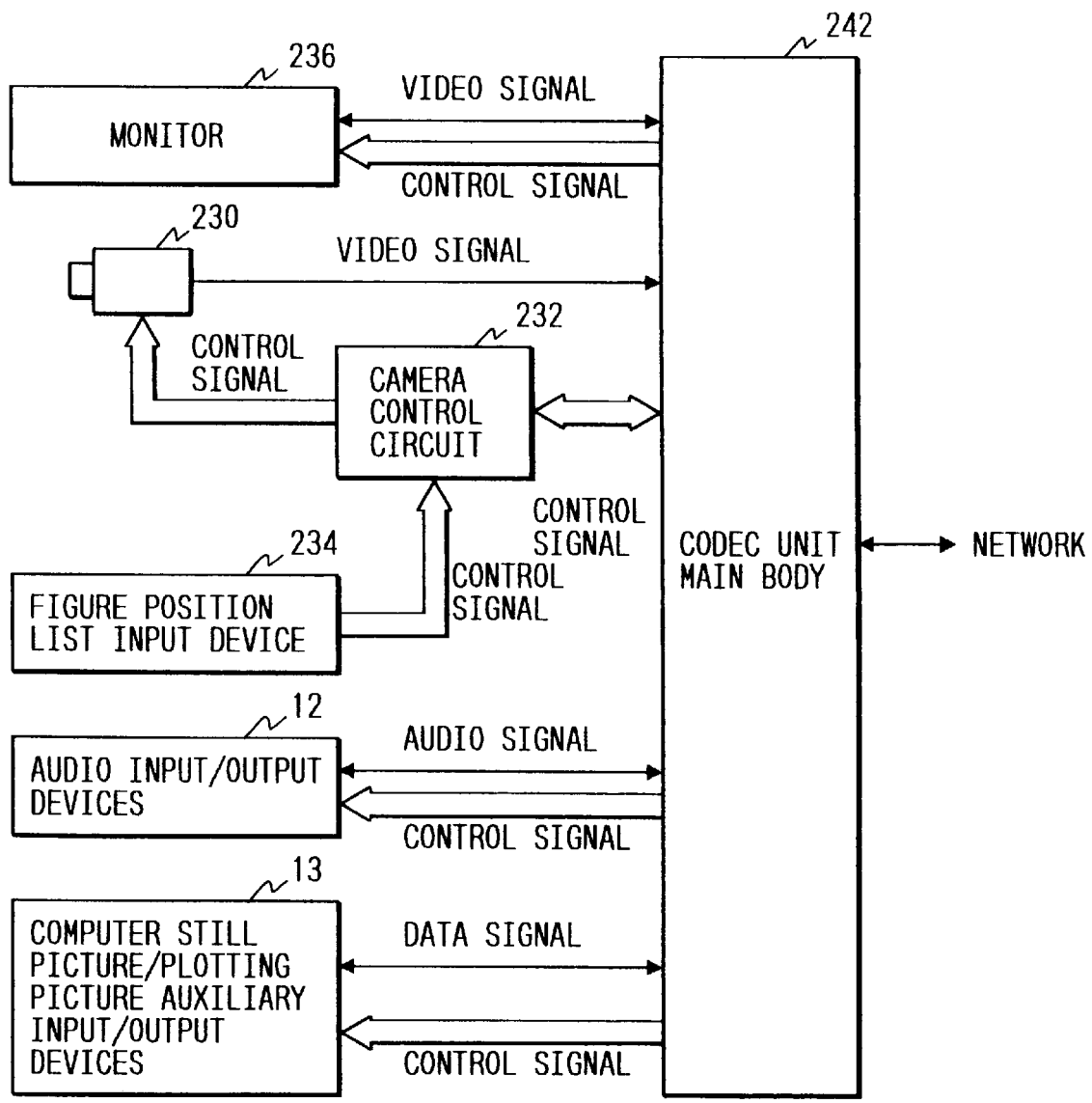
FIG. 14 is a block diagram showing a terminal apparatus according to the fifth embodiment of the present invention.

FIG. 14 is a block diagram showing the arrangement of the fifth embodiment. Referring to FIG. 14, a video camera 230 photographs participants in a conference, and a camera control circuit 232 controls panning, tilting, zooming, and focusing of the video camera 230. A figure position list input device 234 is used to input position information of each participant in a conference sitting in front of the video camera 230. A monitor 236 displays an image.

An audio input/output device 12 and a computer still picture/plotting picture input/output device 13 are the same as those shown in FIG. 1 mentioned earlier.

Figure 16:
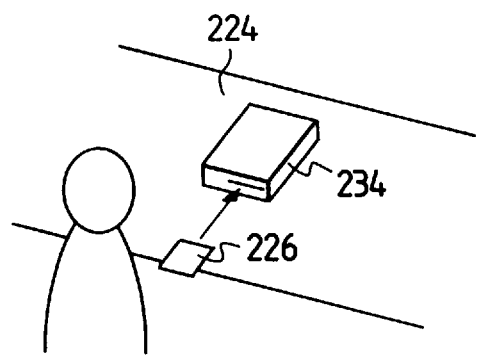
FIG. 16 is a view showing an example of information input using a figure information recording card according to the fifth embodiment.

In this embodiment, as shown in FIG. 15, the figure position list input devices 234 are placed on a table 224 in front of participants in a TV conference. In FIG. 15, it is assumed that there are four participants A, B, C, and D in the conference. The position of each participant with respect to the corresponding figure position list input device 234 on the table 224, in other words, the panning angle, the zooming position, and the focusing position of each participant viewed from the video camera 230 are entered beforehand for the corresponding figure position list input device 234. In this embodiment, therefore, only the ID information (e.g., the name) of each figure need be input from the figure position list input device 234 immediately before a TV conference begins. For example, as shown in FIG. 16, a figure information recording card 226 carried by each participant in a conference need only be inserted into the figure position list input device 234 placed in front of a position at which that participant takes his or her seat.

Figure 17:
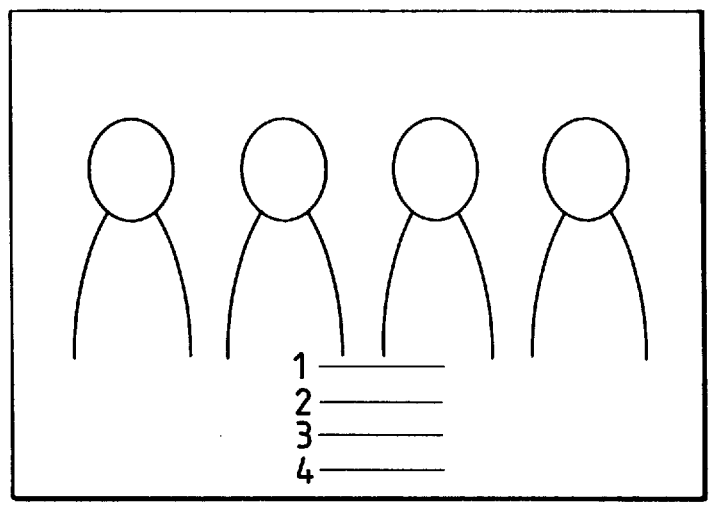
FIG. 17 is a view showing a screen displaying all of four participants in a conference at one terminal according to the fifth embodiment.

Immediately after the conference begins, the camera control circuit 232 controls panning, zooming, and focusing of the video camera 230 in accordance with the figure information and the position information from the figure position list input devices 234, setting an angle of view at which all the participants can fit within one frame. As a result, the photographing frame of the video camera 230 becomes a wide frame to display an image of all participants at that station on a monitor 236 of the self-station or of a partner's station, as shown in FIG. 17. At this point, it is preferred to superimpose numbers (1, 2, 3, and 4 in FIG. 17) for specifying participants in the conference and the names of the participants.

Figure 18:
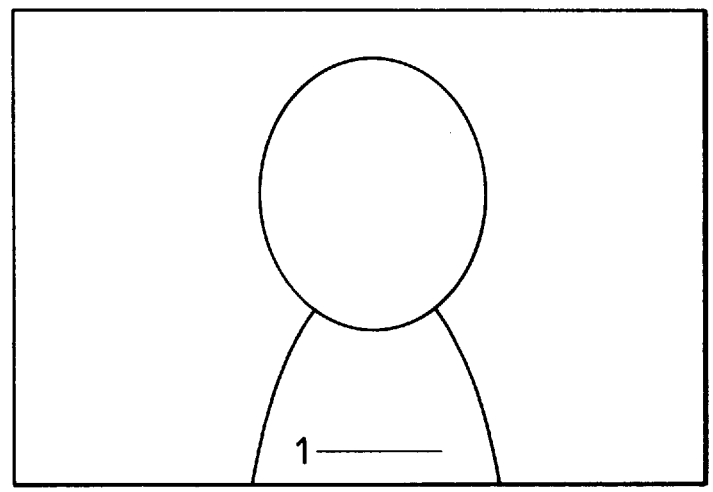
FIG. 18 is a view showing a screen displaying a close-up of one of the four participants shown in FIG. 17.

To photograph a close-up of one particular participant, an operator designates the figure information of that participant, e.g., the number assigned to the participant in the case shown in FIG. 17 by using a keyboard, a digitizer, or a mouse of the I/O device 13. In the self-station, this designated information is supplied to the camera control circuit 232 via a codec unit 242 or via a communication line and the codec unit 242. The camera control circuit 232 determines the position of the figure of interest by comparing the designated information with the figure position information from the figure position list input devices 234, and controls panning, zooming, and focusing of the video camera 230 such that a close-up of the figure of interest is displayed at the center of the screen. As an example, when the figure specified by "1" in FIG. 17 is designated, a close-up of the figure is photographed as shown in FIG. 18.

If a plurality of participants are designated at one time, the camera control circuit 232 controls panning, zooming, and focusing of the video camera 230 such that all the figures designated fit within the photographing frame.

As means for inputting figure information and the position of the figure, it is possible to put badges from which stored data can be read out by wireless on the chests or the like of participants in a conference and to read out the presence/absence and the stored information of the badges by radio waves.

According to this embodiment, desired figures (one participant or two or more participants) can be zoomed by a very simple operation at a self-station or a partner's station. In addition, since the names and the posts of participants are also displayed on the monitor screen, each participant in a TV conference can know the names of the other participants in correspondence with their faces, and this makes a smooth progress of the conference possible.

<6th Embodiment>

When stations participating in a TV conference and those not participating in the conference because of a difference in time or the like are going to refer to proceedings data, there are both necessary proceedings and unnecessary proceedings depending on a partner's station. In order that a given partner's station can extract only necessary proceedings, the sixth embodiment of the present invention facilitates extraction of proceedings by assigning an ID to each partner's station and to proceedings corresponding to that partner's station.

Figure 19:
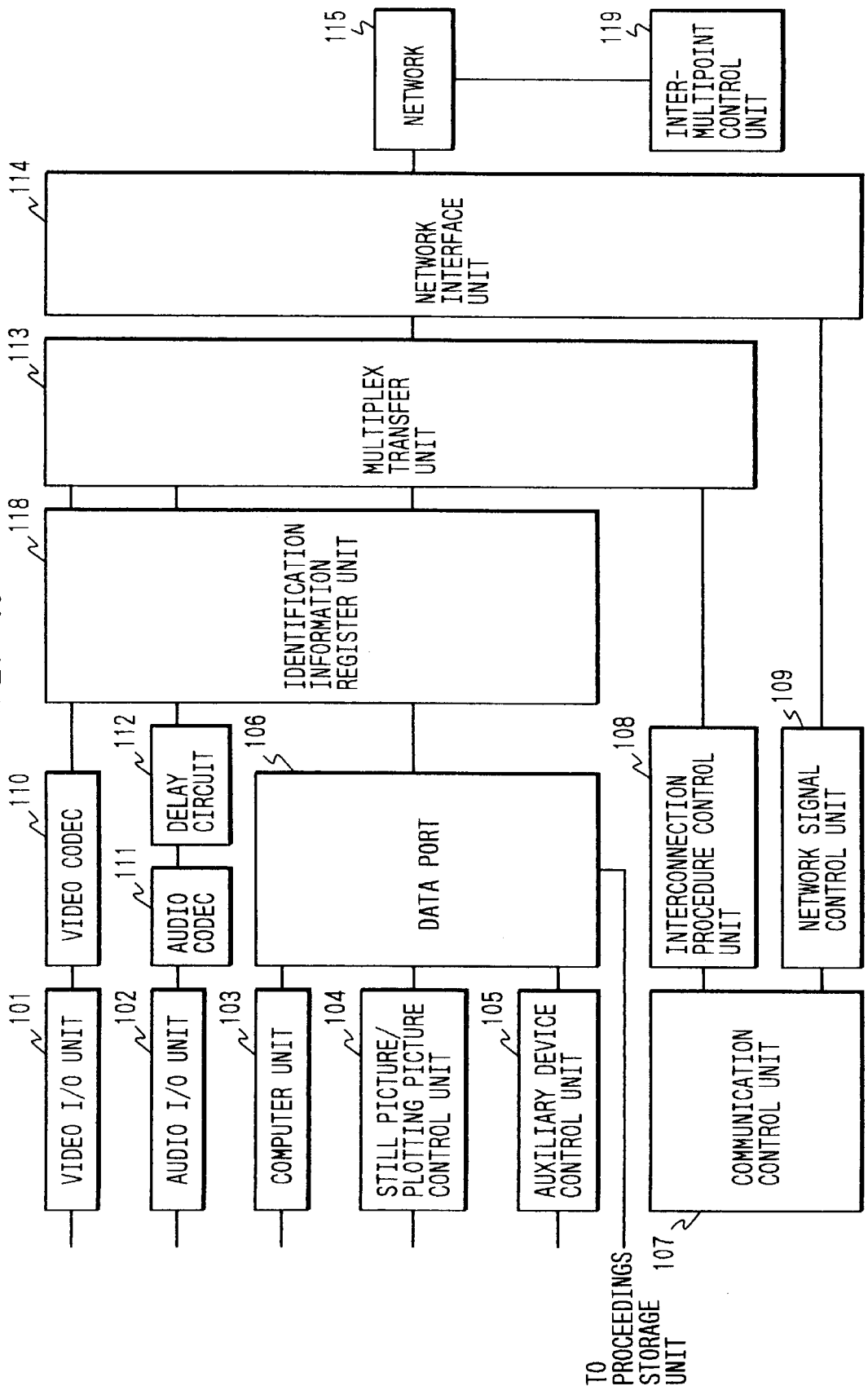
FIG. 19 is a block diagram showing a terminal apparatus according to the sixth embodiment of the present invention.

In the arrangement of a TV conference system according to the sixth embodiment, a storage unit for storing proceedings is connected to a codec unit in the arrangement shown in FIG. 1, and the configuration of the codec unit is also slightly changed. FIG. 19 is a block diagram showing the arrangement of the codec unit according to the sixth embodiment.

Figure 2:
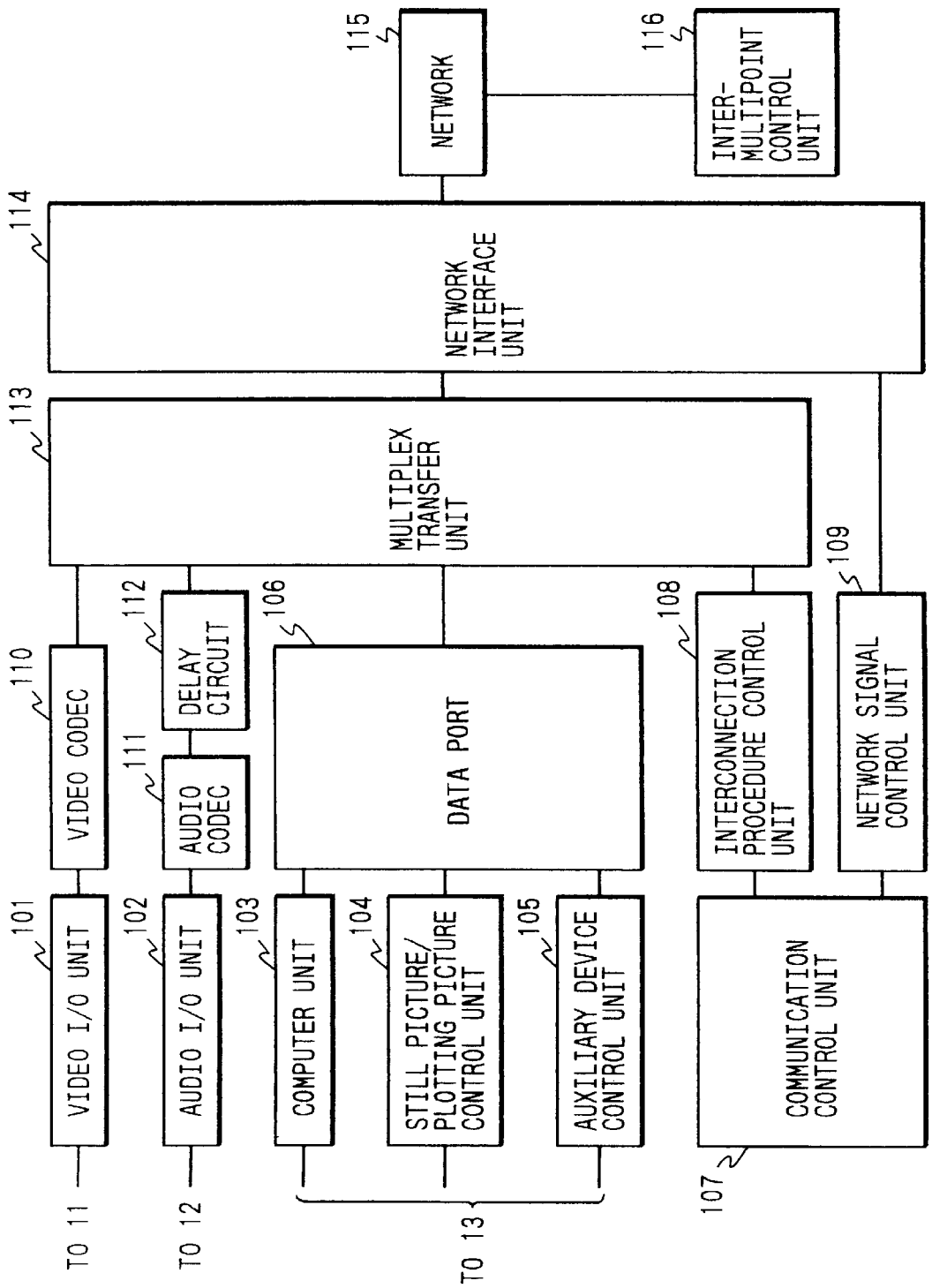
FIG. 2 is a block diagram showing a codec unit shown in FIG. 1.

As shown in FIG. 19, the codec unit of the TV conference system of the sixth embodiment is obtained by further providing an identification information register unit 118 in the arrangement shown in FIG. 2 mentioned earlier. The identification information register unit 118 registers the IDs of partner's stations at multiple points in proceedings data.

In FIG. 19, the same reference numerals as in FIGS. 1 and 2 denote the same parts, and a detailed description thereof will be omitted.

Figure 20:
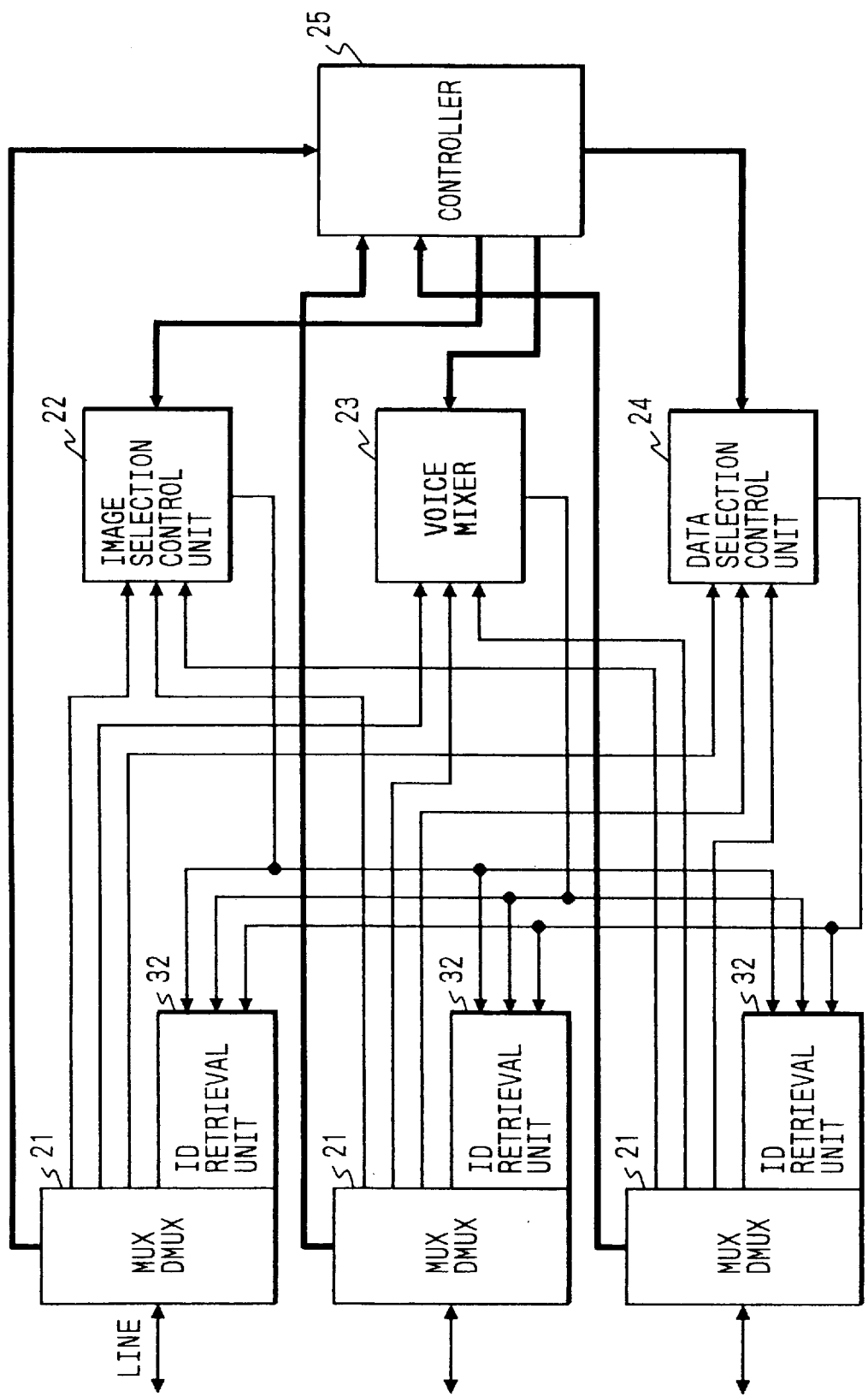
FIG. 20 is a block diagram showing the arrangement of an inter-multipoint control unit according to the sixth embodiment.

FIG. 20 is a block diagram showing an inter-multipoint control unit 119 of this embodiment.

Figure 3:
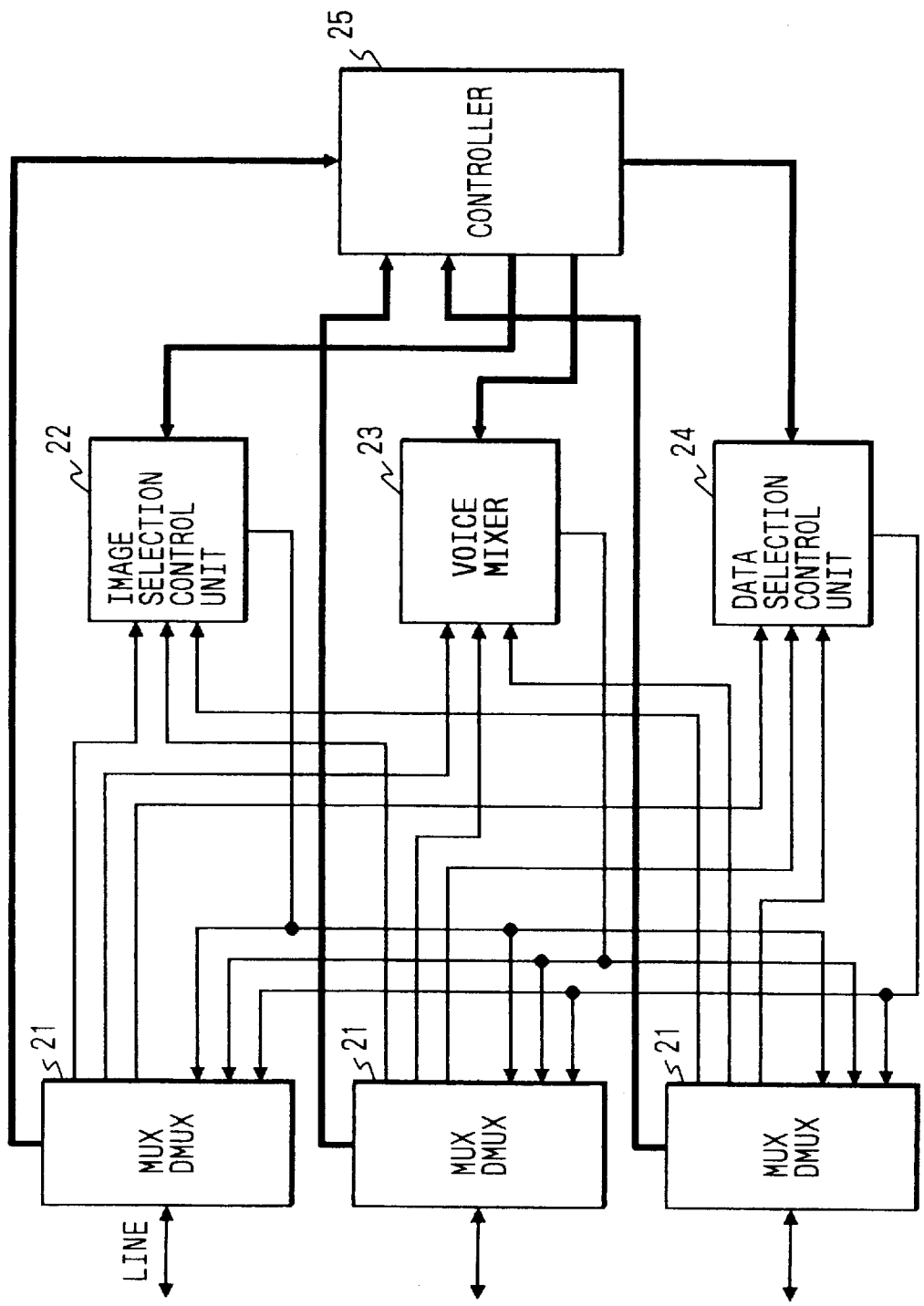
FIG. 3 is a block diagram showing the arrangement of an inter-multipoint control unit shown in FIG. 2.
Figure 4:
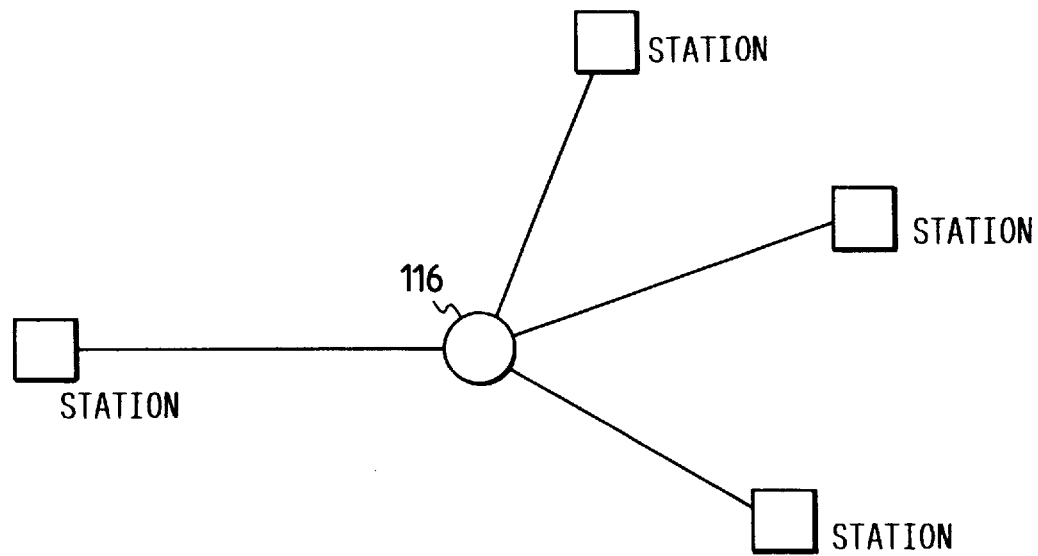
FIG. 4 is a block diagram showing the overall system when multiple points are interconnected.

As shown in FIG. 20, this inter-multipoint control unit 119 is constituted by further providing an ID retrieval unit 32 to each multiplexing/demultiplexing (MUX/DMUX) control unit 21 in the arrangement shown in FIG. 3. The ID retrieval unit 32 controls retrieval of proceedings data in which identification information for each station, such as an ID, is registered.

Note that the other parts are the same as those shown in FIG. 3 and denoted by the same reference numerals, and a detailed description thereof will be omitted.

Figure 21:
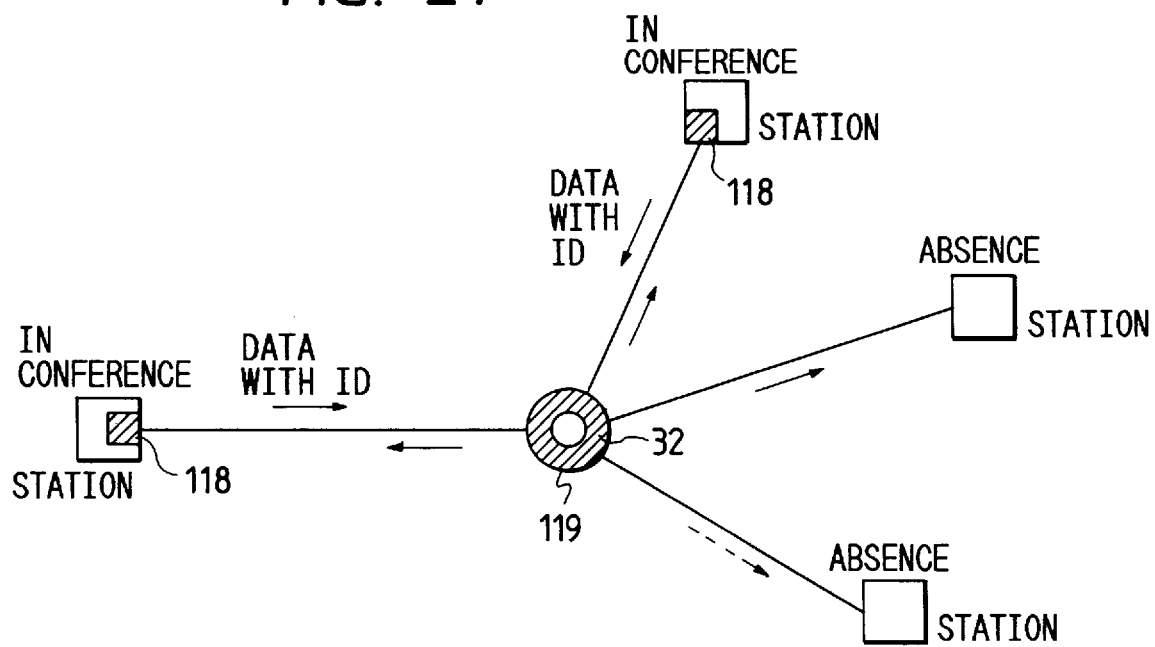
FIG. 21 is a block diagram showing data communications between the inter-multipoint control unit and the terminals according to the sixth embodiment.

FIG. 21 is a block diagram showing the whole system for explaining registration and retrieval of transmission data.

In this embodiment, prior to beginning a TV conference, IDs are determined for stations which take part in the conference. In this case, IDs are also determined for stations which cannot participate in the conference in real time under the influence of a difference in time or the like.

In actually holding the TV conference, each station participating in the conference in real time transmits various data including images and voices to the inter-multipoint control unit 119 while registering the IDs of partner's stations to which the data are to be transferred by using the ID information register unit 118.

The various data transmitted to the inter-multipoint control unit 119 are demultiplexed into images, voices, and the other data by the MUX/DMUX control unit 21. The images, the voices, and the other data thus demultiplexed are distributed to an image selection control unit 22, a voice mixer 23, and a data selection control unit 24, respectively. Under the control of a controller 25, the image selection control unit 22, the voice mixer 23, and the data selection control unit 24 perform switching between data to be transmitted, and the voice mixer 23 also synthesizes the transmitted voice data and sends the synthesized data to the ID retrieval unit 32 of each station.

The ID retrieval unit 32 retrieves the ID of each station and transmits the corresponding data to that station. Each station participating in the conference in real time immediately reproduces the transmitted data. Each station that cannot take part in the conference in real time, on the other hand, stores the data in the proceedings storage unit of the station and later reads out and reproduces the data.

With this arrangement, it is also possible to control proceedings data that can be output to a given partner's station on the self-station side because a correspondence between the proceedings data and the partner's station is obtained by an ID.

Figure 23:
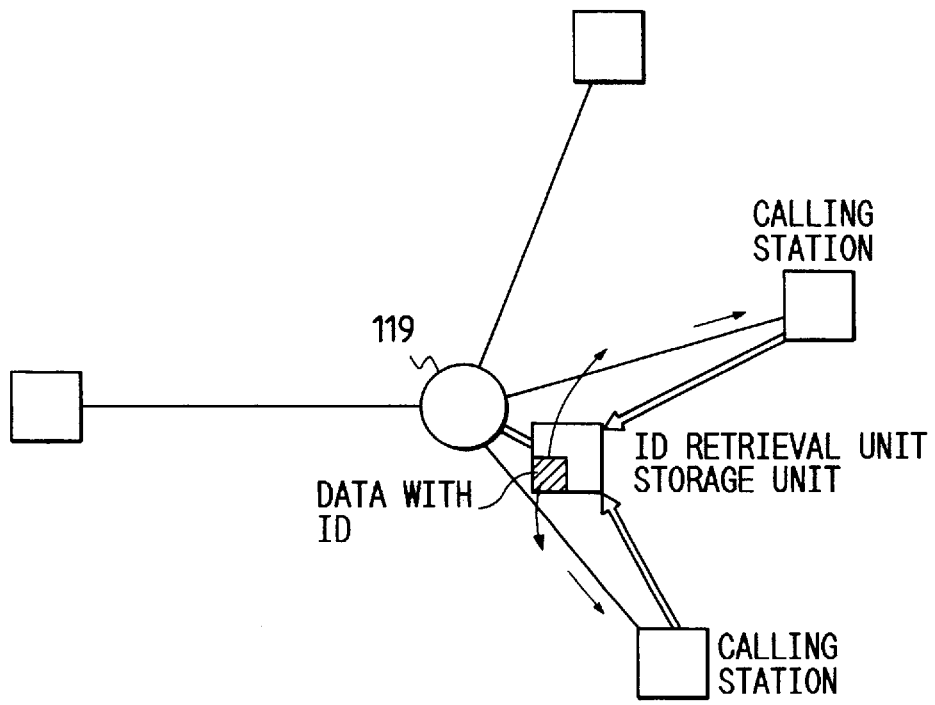
FIG. 23 is a block diagram showing the overall system for explaining entry and retrieval of data to be transferred according to the modification of the sixth embodiment.
Figure 22:
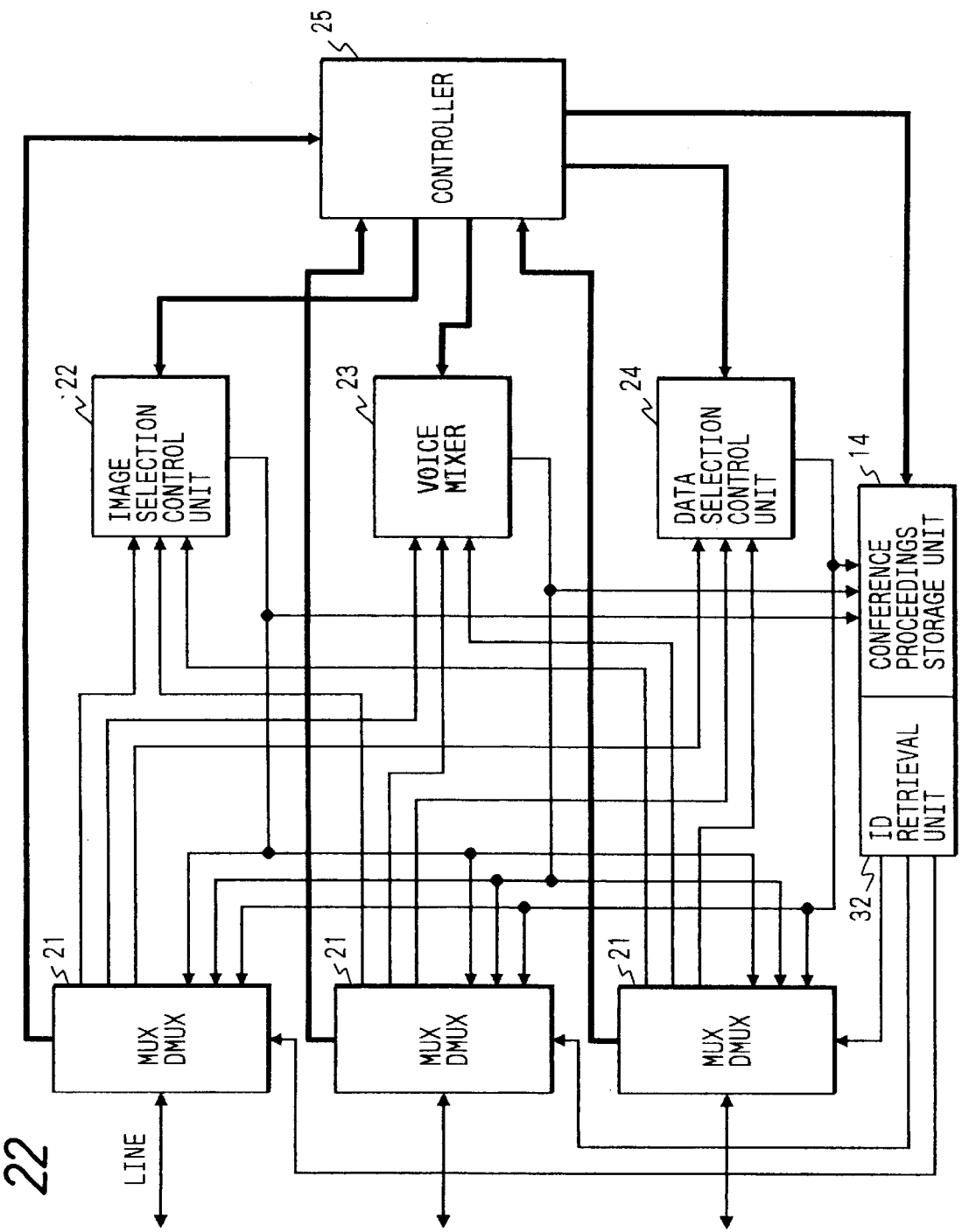
FIG. 22 is a block diagram showing the arrangement of an inter-multipoint control unit according to a modification of the sixth embodiment.

An arrangement in which individual stations need not have their respective proceedings storage units but can share the storage unit of the inter-multipoint control unit 119 will be described below. FIG. 22 shows the inter-multipoint control unit 119 in this arrangement, and FIG. 23 is a block diagram showing the overall system for explaining how to register and retrieve data to be transmitted in this arrangement.

In this case, proceedings data in which ID information is registered is stored in a proceedings storage unit 33 of the inter-multipoint control unit. Each station that could not participate in the conference later controls the storage unit 33 via the controller 25, extracting the proceedings data from the storage unit 33. At this point, the station retrieves the registered ID and can therefore read out proceedings data in which the ID corresponding to the self-station is registered.

<7th Embodiment>

In transmitting information such as proceedings from a station on the transmission side to a terminal that could not participate in a conference, data may be destroyed if the information is erroneously transmitted during a non-idle time of the partner's station. In the seventh embodiment of the present invention, schedule setting for matching idle times in order to prevent the above inconvenience will be described.

Figure 29:
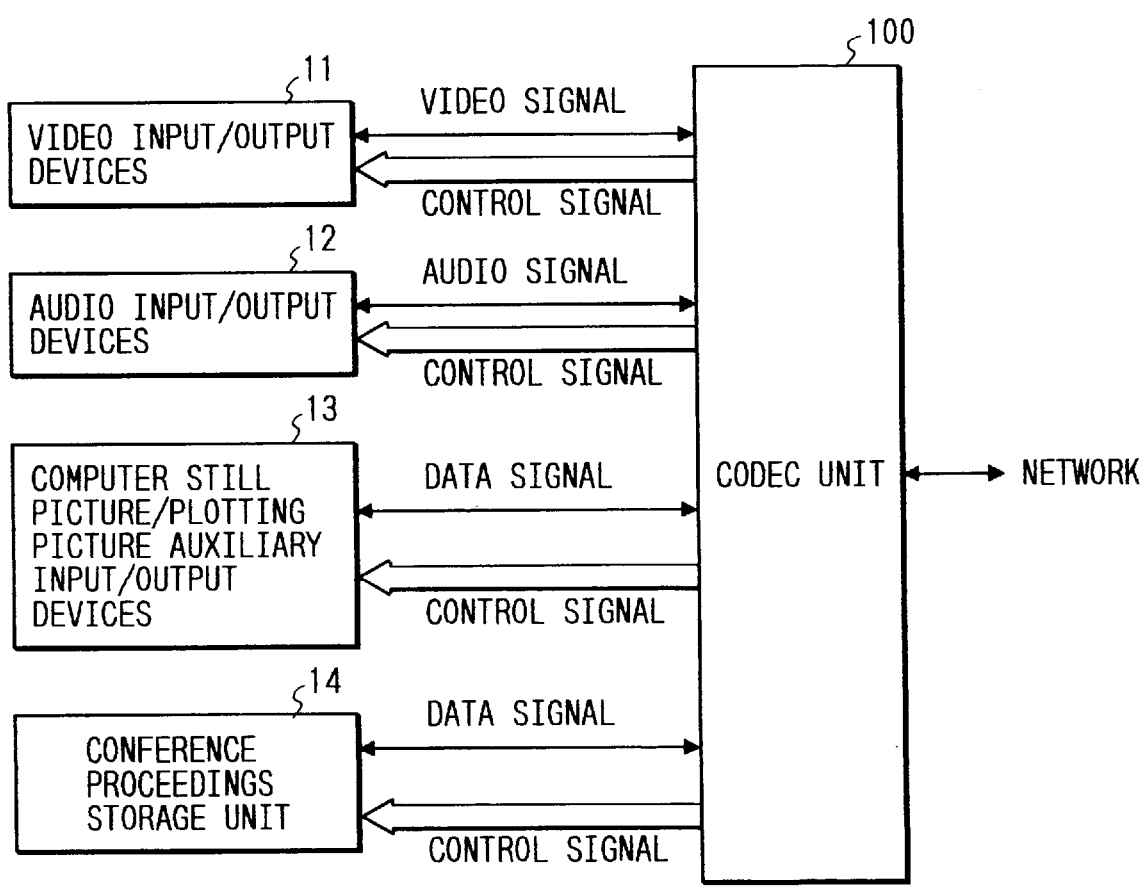
FIG. 29 is a block diagram showing a terminal apparatus according to the seventh embodiment.

The arrangement of a TV conference system according to this embodiment is shown in FIG. 29. Referring to FIG. 29, a proceedings storage unit 14 for storing proceedings data is connected to a codec unit in the arrangement shown in FIG. 1.

Figure 24:
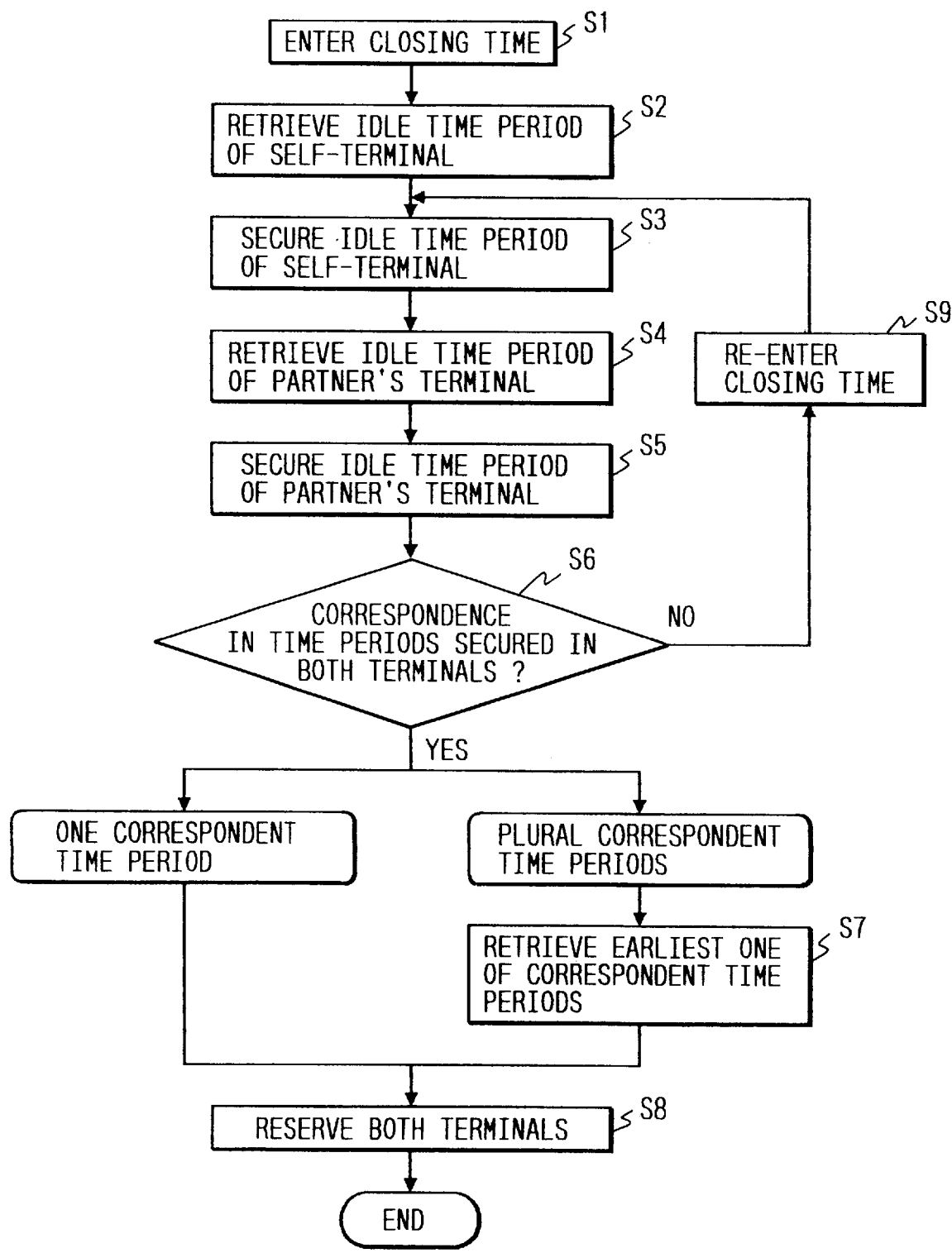
FIG. 24 is a flow chart showing a process of entering a communication time according to the seventh embodiment of the present invention.

An operation of selecting data to be transmitted from the data stored in the proceedings storage unit 14 and entering a data transmission time in schedules of both the transmission and reception stations will be described first with reference to FIG. 24. Assume that the data to be transmitted is already stored in the proceedings storage unit 14 by video input/output devices 11, audio input/output devices 12, and the like.

First, a closing time until which the data stored in the proceedings storage unit 14 can be transmitted to a partner's terminal is entered from a self-terminal (step S1). This closing time is entered in units of, e.g., 30 minutes by using a keyboard or the like of a computer 6. Subsequently, idle time periods of the self-terminal before the closing time entered in step S1 are retrieved (step S2), and all the idle time periods retrieved are secured (step S3). The self-terminal connects its line to a partner's terminal to which the data is to be transmitted. The self-terminal then sends a command for obtaining schedule data of the partner's terminal and waits until the schedule information of the partner's terminal is obtained. When the schedule information of the partner's terminal is obtained, the self-terminal retrieves idle time periods of the partner's terminal (step S4) and secures all the idle time periods retrieved (step S5).

Whether a correspondence is present in the time periods secured in the both terminals is checked (step S6). If a correspondent time period is present, this time period is reserved in the both terminals (step S8), and the procedure is ended. If a plurality of correspondent time periods are found as the result of retrieval in step S6, the earliest one of these correspondent time periods is selected (step S7) and reserved in the both terminals (step S8).

If no correspondent time period is found as the result of retrieval in step S6, the closing time is re-entered (step S9), and the flow returns to step S2. At this point, information indicating that no correspondent time period is present between the two terminals may be displayed on the screen of a monitor 5 of the self-terminal.

Subsequently, a time indicated by a timer (not shown) and the reserved time are compared, and transmission is simply started when the two times coincide, so a detailed description thereof will be omitted.

According to this embodiment as described above, in the TV conference system constituted by connecting through communication lines a plurality of conference systems each consisting of an input unit for inputting image data and voice data, an output unit for outputting the image data and the voice data, a transmission unit for performing transmission of these data with respect to distant points, and a control unit for controlling the input unit, the output unit, and the transmission unit, a storage unit for storing motion picture data, still picture data, voice data, and other data is additionally provided. A closing time until which the motion picture data, the still picture data, the voice data, and the other data stored in a self-station can be transmitted to a partner's station is entered, and proceedings information to be transmitted and a transmission destination are input. The schedule data of the partner's station is obtained by transmitting a partner's station information entry request command from the self-station. By taking into account idle time periods of both the self-station and the partner's station, a correspondent idle time period can be set in the schedules of the both terminals so that the data are transmitted during an idle time period of the communication line. Therefore, it is unnecessary to retrieve idle time periods of the partner's station in order to transmit the data stored in the self-station to the partner's station. This improves operability and eliminates erroneous transmission of the data while the partner's station is taking part in another TV conference.

Although only one transmission destination is set in the above embodiment, data may be transmitted to a plurality of destinations simultaneously. In this case, the schedules of the individual transmission destination systems are extracted, and a common idle time period of these systems is selected.

This embodiment can be applied to either a system comprising a plurality of devices or an apparatus including only one device. This embodiment is also applicable to an arrangement achieved by supplying programs to a system or an apparatus.

<8th Embodiment>

The eighth embodiment of the present invention in which a multi-point control unit including a central storage unit manages all schedules will be described below.

Figure 25:
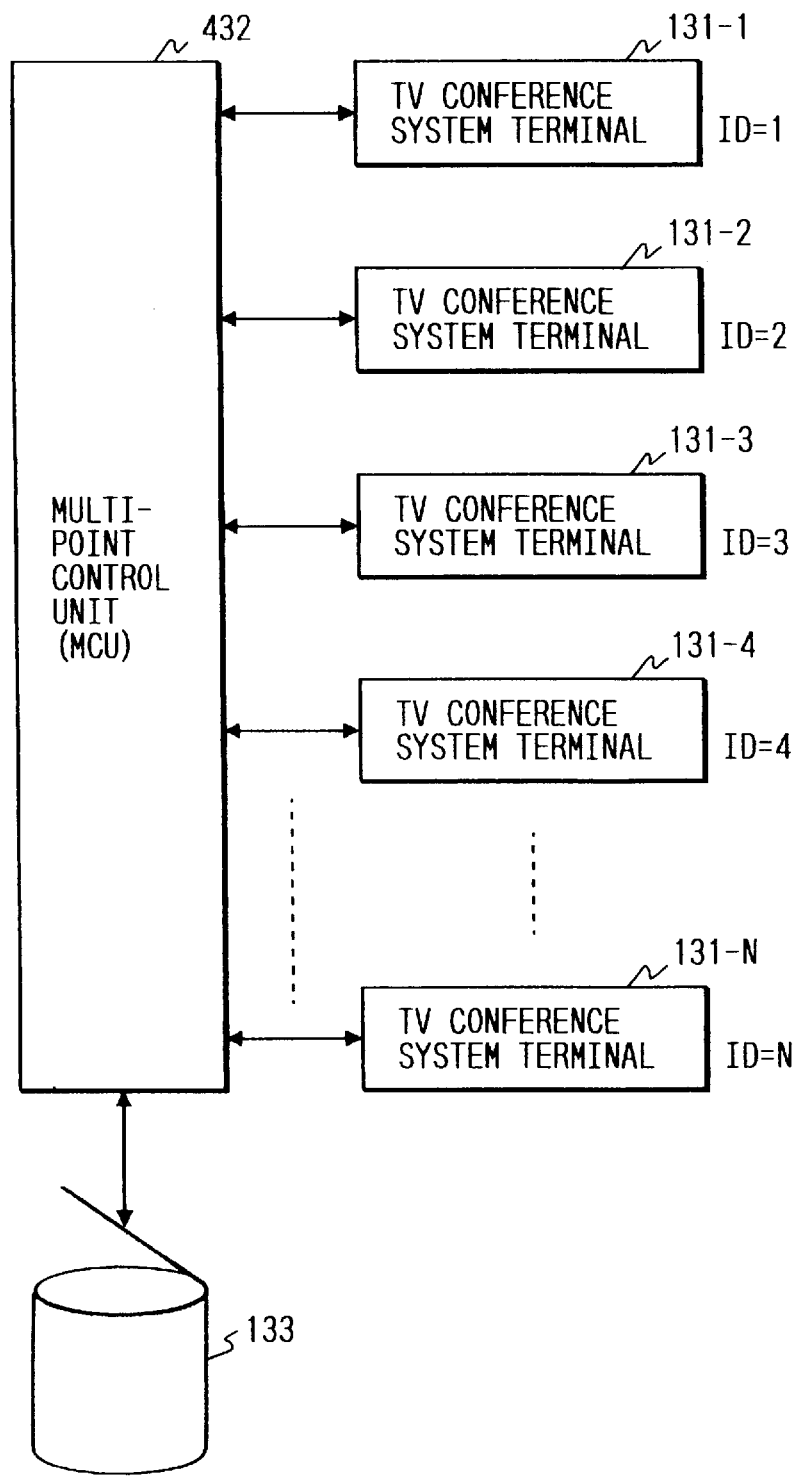
FIG. 25 is a view showing the arrangement of a TV conference system according to the seventh embodiment.

FIG. 25 is a block diagram showing the arrangement of a TV conference system according to this embodiment. In FIG. 25, the same reference numerals as in FIG. 5 denote parts having the same functions, and a detailed description thereof will be omitted.

The multi-point control unit shown in FIG. 5 performs control for setting a schedule for holding a TV conference. In this embodiment, on the other hand, a multi-point control unit 432 performs control for setting a schedule for transmitting data such as proceedings, thereby transferring the data at a predetermined time.

Figure 26:
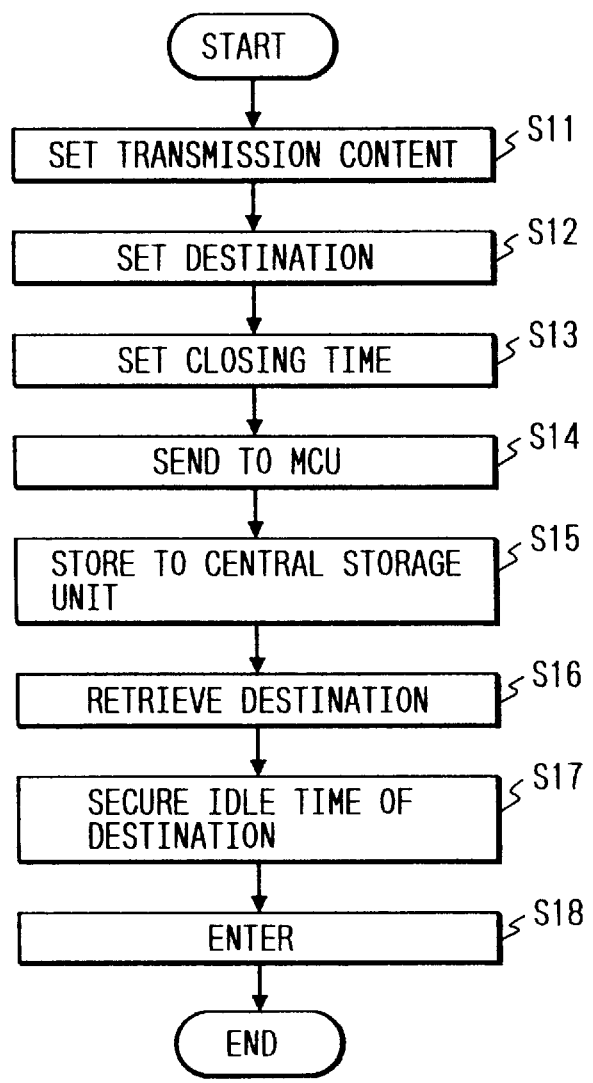
FIG. 26 is a flow chart showing a process of entering a communication time according to the eighth embodiment of the present invention.

An operation of performing transmission reservation of schedule data, in which data stored in a proceedings storage unit 14 is selected at each terminal and stored in a central storage unit 133, will be described below with reference to FIGS. 26 and 27.

Figure 27:
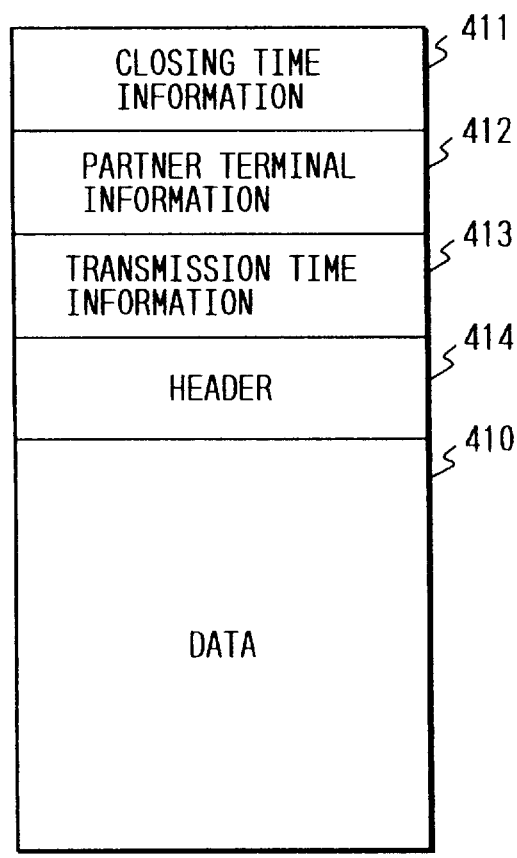
FIG. 27 is a view showing the format of transmission data to be transmitted from each terminal according to the eighth embodiment.

First, when a content of data to be transmitted to a partner's station is set in a self-terminal, a header, such as the title of the transmission content, is written in a header area 414 shown in FIG. 27, and the transmission content is also written in a data area 416 shown in FIG. 27 (step S11).

Subsequently, a destination terminal is set (step S12), and a closing time is set (step S13). These information are written in a partner's terminal information area 412 and a closing time information area 411, and the above additional information (e.g., the destination terminal and the closing time) and the data are transmitted to a multi-point control unit (MCU) 432 (step S14).

The multi-point control unit 432 stores the data together with the additional information in the central storage unit 133 (step S15), and retrieves the destination terminal set in the additional information (step S16). The multi-point control unit 432 secures an idle time of the destination before the closing time set in the additional information (step S17), and enters this information as transmission time information in a transmission time information area 413 in the central storage unit 133 (step S18). If a plurality of destination terminals are set in step S12, destination terminal information and transmission closing time information of each individual destination are entered. In addition, if there is no common idle time between the two terminals before the closing time transmitted to the multi-point control unit 432, the closing time is reset.

Figure 28:
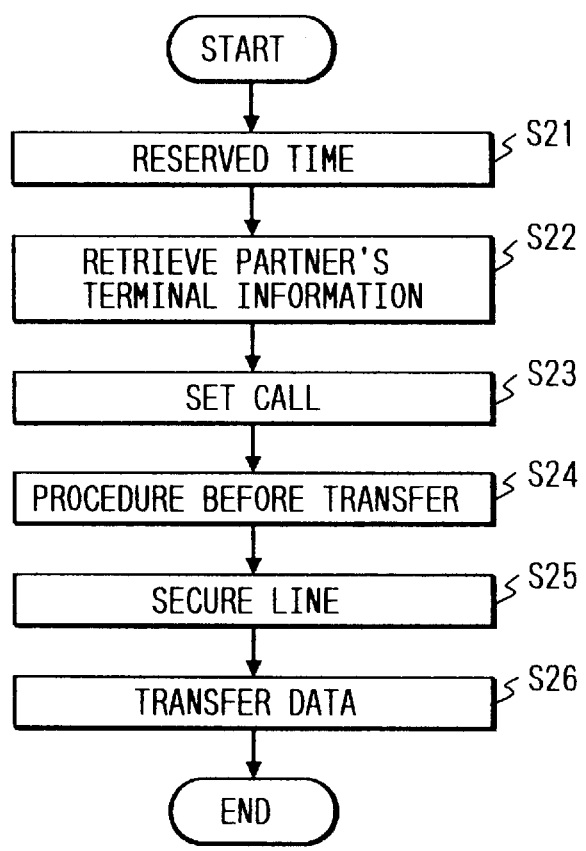
FIG. 28 is a flow chart for explaining an operation of transmitting data at a reserved time according to the eighth embodiment.

The data transmission processing performed by the multi-point control unit 432 will be described below with reference to FIG. 28. When the transmission reserved time based on the idle time entered in the central storage unit 133 is reached (step S21), the multi-point control unit 432 retrieves the partner's terminal information area 412 entered in the central storage unit 113 (step S22). The multi-point control unit 432 then executes a call setting procedure for the destination terminal, establishing a communication path with respect to the partner's terminal (step S23). Subsequently, the multi-point control unit 432 executes a procedure before transfer to negotiate transmission functions, thereby securing a line (step S24). The multi-point control unit 432 then transfers data (area 410) designated by the header information (area 414) entered in the central storage unit 133 through this secured line (step S25). When the transmission is completed, the multi-point control unit 432 ends the processing.

According to this embodiment, therefore, in transmitting data to the partner's terminal by reserving the transmission time, no schedule data for this transmission is stored in terminals 131-1 to 131-N. This makes it possible to effectively enter time schedule data for actually holding a TV conference at the terminals 131-1 to 131-N.

In this embodiment, since the multi-point control unit can solely manage information to be transmitted, a transmission source of data need only transmit the data to the multi-point control unit. The transmission source can therefore execute another processing while the data is actually being transmitted to a destination.

According to the present invention as has been described above, not only a smooth TV conference can be held but also schedule management, data formation, and the like can be easily performed by a transmission station and a reception station.

The present invention is not limited to the above embodiments, but various modifications may be made without departing from the scope of claims.

What is claimed is:

1. A conference apparatus for performing communication between a plurality of terminals, comprising:

first storage means for automatically storing conference information including proceedings data of a conference held between said plurality of terminals;

communication means for transmitting the conference information including the proceedings data to terminals which participate in the conference and for receiving said proceedings data corrected by a specific person; and second storage means for storing the corrected proceedings data, wherein said specific person is a person, other than a conference participant, who is permitted to access said proceedings data.

2. A system according to claim 1, wherein the conference information including proceedings data comprises figure information, identification information, and time information.

3. A system according to claim 1, further comprising:

editing means for editing the stored conference information.

4. A conference apparatus connected to an image pick-up apparatus, for performing communication between a plurality of terminals, comprising:

storage means for storing proceedings data of a conference held between said plurality of terminals and information of a person having access to said proceedings data;

power supply control means for controlling a power supply to said storage means without supplying power to said image pick-up apparatus in accordance with a power supply control signal transmitted from another terminal through a communication line; and comparison means for comparing identification information of said other terminal with said person having access information after the supply of said power supply, wherein access to said proceedings data is permitted in accordance with a result of said comparison.

5. A system according to claim 4, further comprising:

entering means for entering communication partners which can access a self-terminal; and control means for permitting only said partner's stations entered by said entering means to access the proceedings data.

6. A system according to claim 5, wherein said entering means performs entry by using figure information and a telephone number.

7. A system according to claim 5, wherein said control means controls data output and editing.

8. A conference terminal for performing communication between a plurality of terminals, comprising:

identifying means for identifying a point at which the content of conference information concerning a conference held by communication between said plurality of terminals changes;

first storage means for storing the conference information;

second storage means for storing, as index data corresponding to time, the point which is determined by said identifying means; and transmitting means for transmitting said index data to a certain terminal in accordance with a request for said conference information from said certain terminal.

9. A terminal according to claim 8, wherein the conference information comprises conference materials and proceedings data.

10. A terminal according to claim 8, wherein said first and second storage means are the same storage means.

11. A communication system constituted by a plurality of terminals, comprising:

storage means for storing transmission data;

entering means for entering a closing time until which the transmission information stored in said storage means can be transmitted to another terminal;

first retrieving means for retrieving idle time periods of a self-terminal before the entered closing time, during which the transmission data can be transmitted;

second retrieving means for retrieving idle time periods of said partner's terminals, to which the proceedings information is to be transmitted, before the entered closing time; and determining means for determining a transmission time in accordance with said first and second retrieving means.

12. A system according to claim 11, further comprising:

second entering means for re-entering the closing time if no transmission time is determined between said first and second retrieving means.

13. A system according to claim 11, wherein if a plurality of transmission possible times are present, said determining means determines the earliest one of the transmission possible times as the transmission time.

* * * * *